US011545759B2

(12) United States Patent
Lee et al.

(10) Patent No.: US 11,545,759 B2
(45) Date of Patent: Jan. 3, 2023

(54) METHOD AND APPARATUS FOR TRANSMITTING AND RECEIVING SIGNAL IN A WIRELESS COMMUNICATION SYSTEM

(71) Applicant: Samsung Electronics Co., Ltd., Suwon-si (KR)

(72) Inventors: Jaehyun Lee, Suwon-si (KR); Hyojin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 16/996,700

(22) Filed: Aug. 18, 2020

(65) Prior Publication Data

US 2021/0167512 A1    Jun. 3, 2021

(30) Foreign Application Priority Data

Nov. 29, 2019    (KR) .......................... 10-2019-0157120

(51) Int. Cl.
*H01Q 3/46* (2006.01)
*H01Q 15/00* (2006.01)
(Continued)

(52) U.S. Cl.
CPC ......... *H01Q 15/0086* (2013.01); *H01Q 1/246* (2013.01); *H01Q 3/30* (2013.01);
(Continued)

(58) Field of Classification Search
CPC .......... H01Q 1/246; H01Q 1/24; H01Q 15/00; H01Q 15/0026; H01Q 15/0086;
(Continued)

(56) References Cited

U.S. PATENT DOCUMENTS 7,570,221 B2 *  8/2009  May .................. H01Q 15/10
                                                 343/753
7,855,691 B2 * 12/2010  Yonak ............. H01Q 15/0086
                                                 343/755
(Continued)

FOREIGN PATENT DOCUMENTS

EP    3 300 172 A1    3/2018
KR    10-0994129 B1   11/2010
(Continued)

OTHER PUBLICATIONS

International Search Report and Written Opinion of the International Searching Authority in connection with International Application No. PCT/KR2020/010568 dated Nov. 25, 2020, 10 pages.
(Continued)

*Primary Examiner* — Tho G Phan

(57) ABSTRACT

A method and apparatus for transceiving a signal in a wireless communication system is provided. A base station for transceiving a signal in a wireless communication system includes a transceiver and at least one processor. The transceiver includes an antenna unit and a metamaterial unit. The metamaterial unit includes a metamaterial lens unit and a metamaterial lens controller, and the at least one processor is configured to generate a first beam via hybrid beamforming in the antenna unit; transmit the generated first beam to the metamaterial lens unit, generate a second beam from the first beam, by adjusting the metamaterial lens unit, based on a control signal generated by the metamaterial lens controller, and transmit a downlink signal to a terminal by using the generated second beam.

20 Claims, 25 Drawing Sheets

(51) Int. Cl.
  *H01Q 19/06* (2006.01)
  *H01Q 15/02* (2006.01)
  *H01Q 1/24* (2006.01)
  *H04B 7/06* (2006.01)
  *H04B 7/0408* (2017.01)
  *H01Q 3/30* (2006.01)

(52) U.S. Cl.
  CPC ......... *H01Q 15/0026* (2013.01); *H01Q 15/02* (2013.01); *H04B 7/0408* (2013.01); *H04B 7/0617* (2013.01); *H04B 7/0695* (2013.01)

(58) Field of Classification Search
  CPC ........ H01Q 15/02; H01Q 15/10; H01Q 25/00; H01Q 19/06; H01Q 3/26; H01Q 3/30; H01Q 3/44; H01Q 3/46; H04B 7/0408; H04B 7/06; H04B 7/0617; H04B 7/0695; H04B 7/0456
  See application file for complete search history.

(56) References Cited

U.S. PATENT DOCUMENTS

| | | | |
|---|---|---|---|
| 8,164,531 B2* | 4/2012 | Lier | H01Q 21/061 |
| | | | 343/753 |
| 8,350,759 B2 | 1/2013 | Ju et al. | |
| 8,659,502 B2 | 2/2014 | Lam et al. | |
| 9,812,786 B2 | 11/2017 | Foo | |
| 10,050,344 B2* | 8/2018 | Black | H01Q 3/44 |
| 10,116,051 B2* | 10/2018 | Scarborough | H01Q 25/007 |
| 10,312,597 B2* | 6/2019 | Savage | H01Q 15/02 |
| 11,070,269 B2* | 7/2021 | Lee | H01Q 21/28 |
| 11,233,334 B2* | 1/2022 | Ko | H01Q 15/08 |
| 2011/0199273 A1 | 8/2011 | Kim et al. | |
| 2017/0062945 A1 | 3/2017 | Foo | |
| 2019/0020107 A1 | 1/2019 | Polehn et al. | |
| 2019/0074588 A1 | 3/2019 | Scarborough et al. | |
| 2019/0306726 A1 | 10/2019 | Mo et al. | |

FOREIGN PATENT DOCUMENTS

| | | |
|---|---|---|
| KR | 10-1202339 B1 | 11/2012 |
| KR | 10-1574818 B1 | 12/2015 |
| KR | 10-1604386 B1 | 3/2016 |
| KR | 10-1650340 B1 | 8/2016 |
| KR | 10-1753650 B1 | 7/2017 |
| KR | 10-1879429 B1 | 7/2018 |
| KR | 10-1983552 B1 | 5/2019 |
| KR | 10-2027714 B1 | 10/2019 |

OTHER PUBLICATIONS

Teng Li, et al, "Compact Wideband Wide-Angle Polarization-Free Metasurface Lens Antenna Array for Multi-Beam Base Stations," IEEE Transactions on Antennas and Propagation, vol. 68, Issue 3, Oct. 31, 2019, 12 pages.

Yae Jee Cho, et al., "RF Lens-Embedded Antenna Array for mmWave MIMO: Design and Performance," arXiv:1801.07167v1 [eess.SP], Jan. 22, 2018, 9 pages.

Supplementary European Search Report dated Sep. 26, 2022 in connection with European Patent Application No. 20 89 4369, 7 pages.

* cited by examiner

METHOD AND APPARATUS FOR TRANSMITTING AND RECEIVING SIGNAL IN A WIRELESS COMMUNICATION SYSTEM

CROSS-REFERENCE TO RELATED APPLICATION

This application is based on and claims priority under 35 U.S.C. § 119 to Korean Patent Application No. 10-2019-0157120 filed on Nov. 29, 2019 in the Korean Intellectual Property Office, the disclosure of which is incorporated by reference herein in its entirety.

BACKGROUND

1. Field

The disclosure relates to a method and apparatus for transmitting and receiving a signal in a wireless communication system.

2. Description of the Related Art

In order to meet the increasing demand with respect to wireless data traffic after the commercialization of $4^{th}$ generation (4G) communication systems, efforts have been made to develop improved $5^{th}$ generation (5G) communication systems or pre-5G communication systems. For this reason, 5G communication systems or pre-5G communication systems are called Beyond 4G network communication systems or Post LTE systems. In order to achieve a high data transmission rate, the implementation of 5G communication systems in millimeter wave (mmW) frequency bands (e.g., 60 GHz bands) is being considered. In order to reduce propagation path loss of electric waves and increase a propagation distance of electric waves in the millimeter wave frequency bands, in 5G communication systems, discussions are underway about technologies such as beam-forming, massive multiple input multiple output (MIMO), full dimensional MIMO (FD-MIMO), array antenna, analog beam-forming, and large scale antenna. Also, in order to improve networks of systems, in 5G communication systems, the development of technologies such as evolved small cell, advanced small cell, cloud radio access network (cloud RAN), ultra-dense network, device to device communication (D2D), wireless backhaul, moving network, cooperative communication, coordinated multi-points (CoMP), and interference cancellation is underway. Furthermore, in 5G communication systems, the development of an advanced coding modulation (ACM) scheme such as hybrid frequency-shift keying (FSK) and quadrature amplitude modulation (QAM) modulation (FQAM) and sliding window superposition coding (SWSC) and an enhanced network access scheme such as filter bank multi carrier (FBMC), non-orthogonal multiple access (NOMA), or sparse code multiple access (SCMA) is underway.

The Internet has developed from a human-centered network via which people generate and consume information to an Internet of Things (IoT) network via which distributed components, such as objects, transmit or receive information to or from each other and process the information. Internet of Everything (IoE) technology is emerging in which big data processing technology is combined with IoT technology via connection with a cloud server or the like. To implement IoT, technical elements, such as sensing technology, a wired/wireless communication and network infrastructure, service interface technology, and security technology, are required, and thus a sensor network, machine to machine (M2M) communication, machine type communication (MTC), and the like for connection between things have recently been studied. In IoT environments, an intelligent Internet Technology (IT) service for collecting and analyzing data generated by connected objects and creating new value in people's lives may be provided. IoT is applicable to various fields, such as smart homes, smart buildings, smart cities, smart cars or connected cars, smart grids, health care, smart home appliances, and advanced medical care, via the convergence and combination of existing information technology (IT) with various industries.

Accordingly, various attempts are being made to apply 5G communication systems to IoT networks. For example, technology such as a sensor network, M2M communication, or MTC is implemented by 5G communication technology such as beam-forming, MIMO, or array antenna. The application of a cloud RAN as big data processing technology may also be considered an example of convergence of 5G technology and IoT technology.

Because wireless communication systems may provide various services due to the development of the above wireless communication systems, methods of smoothly providing these services are required.

SUMMARY

Provided is a method and apparatus capable of effectively providing services in wireless communication systems.

Additional aspects will be set forth in part in the description which follows and, in part, will be apparent from the description, or may be learned by practice of the presented embodiments of the disclosure.

According to an embodiment of the disclosure, a base station for transceiving a signal in a wireless communication system includes a transceiver and at least one processor. The transceiver receives an antenna unit and a metamaterial unit. The metamaterial unit includes a metamaterial lens unit and a metamaterial lens controller, and the at least one processor is configured to generate a first beam via hybrid beamforming in the antenna unit; transmit the generated first beam to the metamaterial lens unit, generate a second beam from the first beam, by adjusting the metamaterial lens unit, based on a control signal generated by the metamaterial lens controller, and transmit a downlink signal to a terminal by using the generated second beam.

According to another embodiment of the disclosure, an operation method of a base station for transceiving a signal in a wireless communication system includes generating a first beam via hybrid beamforming in an antenna unit; transmitting the generated first beam to a metamaterial lens unit; generating a second beam from the first beam, by adjusting the metamaterial lens unit, based on a control signal generated by a metamaterial lens controller; and transmitting a downlink signal to a terminal by using the generated second beam.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
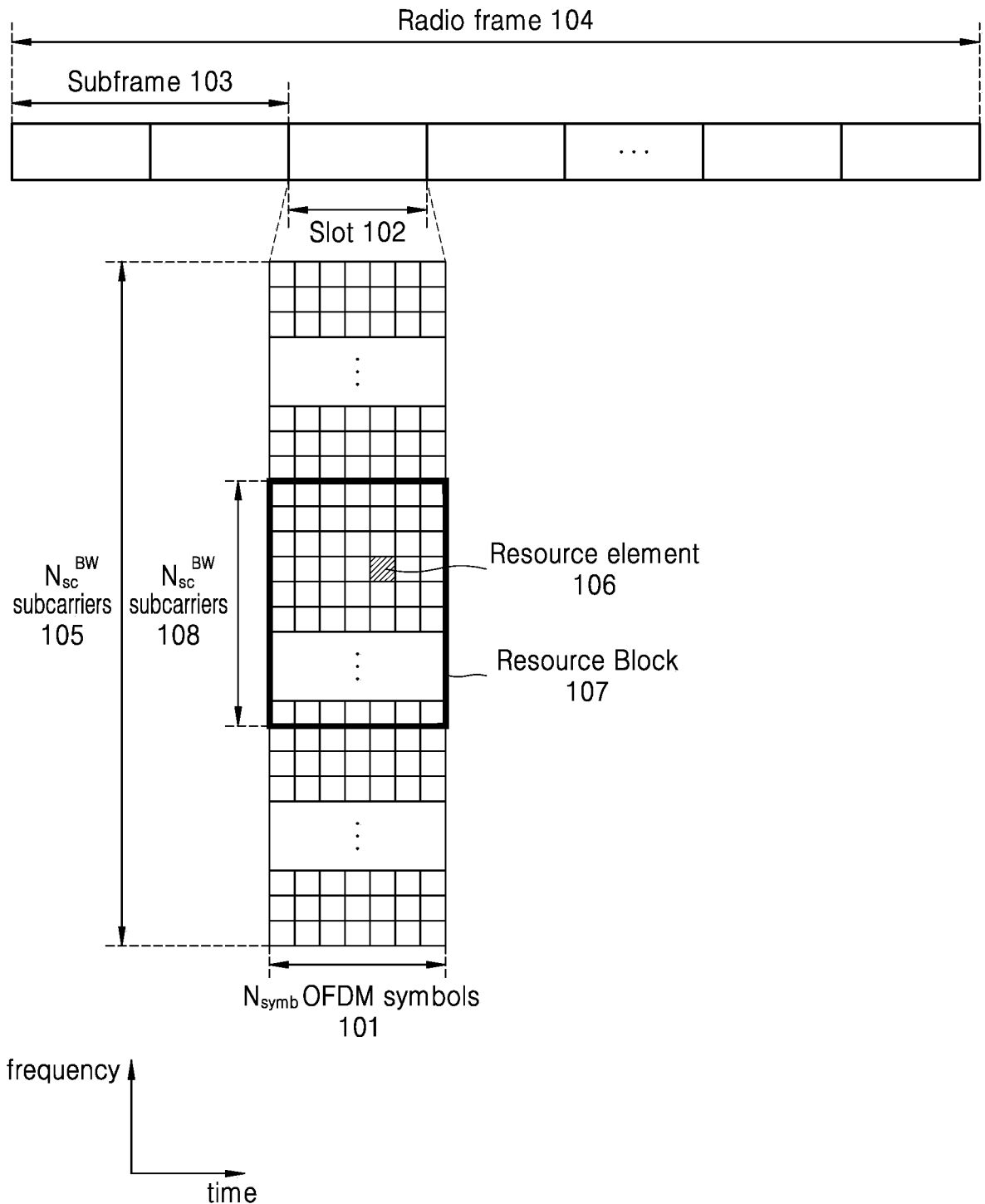
FIG. 1 is a diagram illustrating a basic structure of a time-frequency resource domain in a long term evolution (LTE) system.

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will now be described more fully with reference to the accompanying drawings. While describing the disclosure, detailed description of related well-known functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Thus, the terms should be defined based on the description throughout the specification.

The advantages and features of the disclosure and methods of achieving the advantages and features will become apparent with reference to embodiments of the disclosure described in detail below with reference to the accompanying drawings. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art. The scope of the disclosure is only defined in the claims. Throughout the specification, like reference numerals or characters refer to like elements.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or a layer apparatus) may also be referred to as an entity.

It will be understood that each block of flowchart illustrations and combinations of blocks in the flowchart illustrations may be implemented by computer program instructions. These computer program instructions may be provided to a processor of a general-purpose computer, special purpose computer, or other programmable data processing equipment, such that the instructions, which are executed via the processor of the computer or other programmable data processing equipment, generate means for performing functions specified in the flowchart block(s). These computer program instructions may also be stored in a computer-usable or computer-readable memory that may direct a computer or other programmable data processing equipment to function in a particular manner, such that the instructions stored in the computer-usable or computer-readable memory produce a manufactured article including instruction means that perform the functions specified in the flowchart block(s). The computer program instructions may also be loaded onto a computer or other programmable data processing equipment to cause a series of operational steps to be performed on the computer or other programmable data processing equipment to produce a computer-executable process such that the instructions that are executed on the computer or other programmable data processing equipment provide steps for implementing the functions specified in the flowchart block or blocks.

In addition, each block may represent a module, segment, or portion of code, which includes one or more executable instructions for implementing specified logical function(s). It should also be noted that in some alternative implementations, the functions noted in the blocks may occur out of the presented order. For example, two blocks shown in succession may in fact be executed substantially concurrently or the blocks may sometimes be executed in the reverse order, according to the functionality involved.

The term "unit" or "~er(or)" used herein denotes a software element or a hardware element such as a field-programmable gate array (FPGA) or an application-specific integrated circuit (ASIC), and performs a certain function. However, the term "unit" or "~er(or)" is not limited to software or hardware. The term "unit" or "~er(or)" may be configured to be included in an addressable storage medium or to reproduce one or more processors. Thus, the term 'unit' or ' ~er(or)' may include, by way of example, object-oriented software components, class components, and task components, and processes, functions, attributes, procedures, subroutines, segments of a program code, drivers, firmware, a micro code, a circuit, data, a database, data structures, tables, arrays, and variables. Functions provided by components and 'units' or '~ers(ors)' may be combined into a smaller number of components and 'units' or '~ers (ors)' or may be further separated into additional components and 'units' or '~ers(ors)'. In addition, the components and 'units' or '~ers(ors)' may be implemented to operate one or more central processing units (the CPUs) in a device or a secure multimedia card. According to an embodiment of the disclosure, the 'unit' or '~er(or)' may include one or more processors.

While describing the disclosure, detailed description of related well-known functions or configurations may be omitted when it is deemed that they may unnecessarily obscure the essence of the disclosure. The disclosure will now be described more fully with reference to the accompanying drawings, in which exemplary embodiments are shown.

As used in the following description, terms identifying access nodes, terms indicating network entities, terms indicating messages, terms indicating interfaces between network entities, terms indicating various types of identification information, etc. are exemplified for convenience of explanation. Accordingly, the disclosure is not limited to terms to be described later, and other terms representing objects having the equivalent technical meaning may be used.

Hereinafter, for convenience of description, the disclosure uses terms and names defined in the $3^{rd}$ Generation Partnership Project Long Term Evolution (3GPP LTE) standard. However, the disclosure is not limited to the terms and names but may also be identically applied to systems that comply with other standards. In particular, the disclosure may be applied to the 3GPP New Radio (NR) ($5^{th}$ mobile communications standard). In the disclosure, eNB may be used interchangeably with gNB for convenience of explanation. In other words, a base station described as an eNB may also indicate a gNB. Furthermore, the term 'terminal' may refer to a mobile phone, NB-IoT devices, sensors, and other wireless communication devices.

Hereinafter, a base station is a subject that performs resource allocation of a terminal, and may be at least one of gNode B, eNode B, Node B, base station (BS), a radio access unit, a base station controller, or a node on a network. Examples of a terminal may include a user equipment (UE), a mobile station (MS), a cellular phone, a smartphone, a computer, and a multimedia system capable of performing a communication function. Of course, embodiments of the disclosure are not limited thereto.

A wireless communication system has evolved from an initial one that provides a voice-oriented service to a broadband wireless communication system that provides a high-speed and high-quality packet data service, like the communication standards, such as 3GPP high speed packet access (HSPA), LTE or Evolved Universal Terrestrial Radio Access (E-UTRA), LTE-Advanced (LTE-A), LTE-Pro, 3GPP2 high rate packet data (HRPD), Ultra Mobile Broadband (UMB), the Institute of Electrical and Electronics Engineers (IEEE) 802.16e, etc.

In an LTE system as a representative example of a broadband wireless communication system, orthogonal frequency division multiplexing (OFDM) is employed in a downlink (DL) and single carrier frequency division multiple access (SC-FDMA) is employed in an uplink (UL). The UL means a radio link through which a UE transmits data or a control signal to a base station (eNodeB or BS), and the DL means a radio link through which the base station transmits data or a control signal to the UE. The above-described multiple access scheme may separate data or control information for each user by allocating and operating time-frequency resources on which the data or the control information is carried for each user, so that the time-frequency resources do not overlap each other, that is, so that orthogonality is realized.

A 5G communication system, that is, a post-LTE communication system, needs to freely reflect various requirements from a user and a service provider, such that a service satisfying the various requirements at the same time has to be supported. Services taken into consideration for the 5G communication system may include enhanced mobile broadband (eMBB) communication, massive machine type communication (mMTC), ultra reliability low latency communication (URLLC), etc.

The eMBB aims to provide a further enhanced data transmission speed than a data transmission speed supported by existing LTE, LTE-A, or LTE-Pro. For example, in the 5G communication system, with respect to one BS, the eMBB needs to provide a peak data rate of 20 Gbps in the DL and a peak data rate of 10 Gbps in the UL. Furthermore, the 5G communication system should provide an increased user-perceived data rate while providing the peak data rate. In order to satisfy such a requirement, various transmission and reception technologies including a further enhanced multi-input and multi-output (MIMO) transmission technology must be improved. Moreover, the LTE system transmits a signal using a 20 MHz maximum transmission bandwidth in the 2 GHz band, whereas the 5G communication system transmits a signal using a frequency bandwidth wider than 20 MHz in a frequency band of 3 to 6 GHz or more, thus satisfying the data rates required for the 5G communication system.

In the 5G communication system, mMTC is taken into consideration in order to support application services, such as Internet of Things (IoT). Access by many UEs within a single cell, coverage improvement of a UE, an increased battery time, a reduction in the cost of a UE are required in order for mMTC to efficiently provide for the IoT. The IoT is attached to various sensors and various devices to provide a communication function, and thus should be able to support many UEs (e.g., 1,000,000 UEs/km$^2$) within a cell. Furthermore, a UE supporting mMTC requires wider coverage compared to other services provided by the 5G communication system because there is a high possibility that the UE may be located in a shadow area not covered by a cell, such as the underground of a building. A UE supporting mMTC needs to be a cheap UE, and requires a very long battery lifetime, such as 10 to 15 years, because it is difficult to frequently replace the battery of the UE.

Last, the URLLC is a cellular-based wireless communication service used for mission-critical purposes. For example, the URLLC may be used in remote control of robots or machinery, industrial automation, unmanned aerial vehicles, remote health care, or emergency alert. Accordingly, communication provided by the URLLC should provide very low latency and very high reliability. For example, URLLC-supportive services need to meet an air interface latency of less than 0.5 milliseconds simultaneously with a packet error rate of $10^{-5}$ or less. Accordingly, for URLLC-supportive services, the 5G system needs to provide a transmission time interval (TTI) shorter than that of other services, and also requires the design for allocating a broad resource in a frequency band in order to secure reliability of a communication link.

Three services of the 5G system, namely, eMBB, URLLC, and mMTC, may be multiplexed and transmitted in one system. In order to satisfy different requirements of the services, different transmission and reception schemes and parameters may be used between the services.

Hereinafter, a frame structure of the LTE or LTE-A system will be described in more detail with reference to the drawings.

FIG. 1 is a diagram illustrating a basic structure of a time-frequency resource domain in the LTE system.

For example, FIG. 1 is a diagram illustrating a basic structure of a time-frequency domain that is a radio resource domain where data or a control channel is transmitted in the LTE system.

In FIG. 1, the horizontal axis represents a time domain and the vertical axis represents a frequency domain. In the time domain, a minimum transmission unit is an OFDM symbol, and $N_{symb}$ (101) OFDM symbols may constitute one slot 102 and two slots may constitute one subframe 103. A length of the slot 102 is 0.5 milliseconds (ms), and a length of the subframe 103 is 1.0 ms. A radio frame 104 is a time domain unit including ten subframes 103. In the frequency domain, a minimum transmission unit is a subcarrier, and a bandwidth of an overall system transmission band may include a total of $N_{BW}$(105) subcarriers. A basic resource unit in the time-frequency domain is a resource element (RE) 106 and may be defined by an OFDM symbol index and a subcarrier index. A resource block (RB) or physical resource block (PRB) 107 may be defined by $N_{symb}$ (101) continuous OFDM symbols in the time domain and $N_{RB}$ (108) continuous subcarriers in the frequency domain. Accordingly, one RB 107 may include $N_{symb} \times N_{RB}$ REs 106. In general, a minimum transmission unit of data may be an RB. Generally, in the LTE system, $N_{symb}=7$, $N_{RB}=12$, and $N_{BW}$ and $N_{RB}$ may be proportional to the bandwidth of the system transmission band.

Next, DL control information (DCI) in the LTE or LTE-A system will be described in detail.

In the LTE system, scheduling information for DL data or UL data is transmitted from a base station to a terminal through DCI. Various formats may be defined for the DCI, and thus, pre-defined DCI formats may be applied according to whether the scheduling information is for UL data or DL data, whether the DCI is compact DCI having small control information, whether spatial multiplexing using multiple antennas is applied, or whether the DCI is for power control. For example, LTE DCI format 1 for scheduling control information for DL data may be configured to include at least the following control information.

Resource allocation type 0/1 flag: notifies whether a resource allocation type is type 0 or type 1. The type 0 involves allocating resources in RB group (RBG) units by applying a bitmap scheme. In the LTE system, a basic unit of scheduling is an RB expressed by time and frequency domain resources, and an RBG includes a plurality of RBs and is used as a basic unit of scheduling in the type 0. The type 1 involves allocating a specific RB in an RBG.

RB assignment: notifies an RB allocated for data transmission. A resource represented according to a system bandwidth and a resource allocation scheme is determined.

Modulation and coding scheme (MCS): notifies a modulation scheme used for data transmission and a size of a transport block that is data to be transmitted.

Hybrid automatic repeat request (HARQ) process number: notifies a process number of an HARQ.

New data indicator: notifies whether transmission is HARQ initial transmission or re-transmission.

Redundancy version: notifies a redundancy version of an HARQ.

Transmit power control (TPC) command for physical uplink control channel (PUCCH): notifies a TPC command for a PUCCH that is a UL control channel.

The DCI may be transmitted through a physical downlink control channel (PDCCH) through channel coding and modulation.

A cyclic redundancy check (CRC) may be attached to the payload of a DCI message, and may be scrambled by a radio network temporary identifier (RNTI) corresponding to terminal identity. Different RNTIs may be used according to the purpose of the DCI message, e.g., UE-specific data transmission, power control command, or random access response. Soon, the RNTI may not be explicitly transmitted but may be transmitted by being included in a CRC computation process. Upon receiving the DCI message transmitted onto the PDCCH, the terminal may check the CRC by using the allocated RNTI, and when a confirmation result of the CRC is correct, the terminal may determine that the DCI message is transmitted to the terminal.

Figure 2:
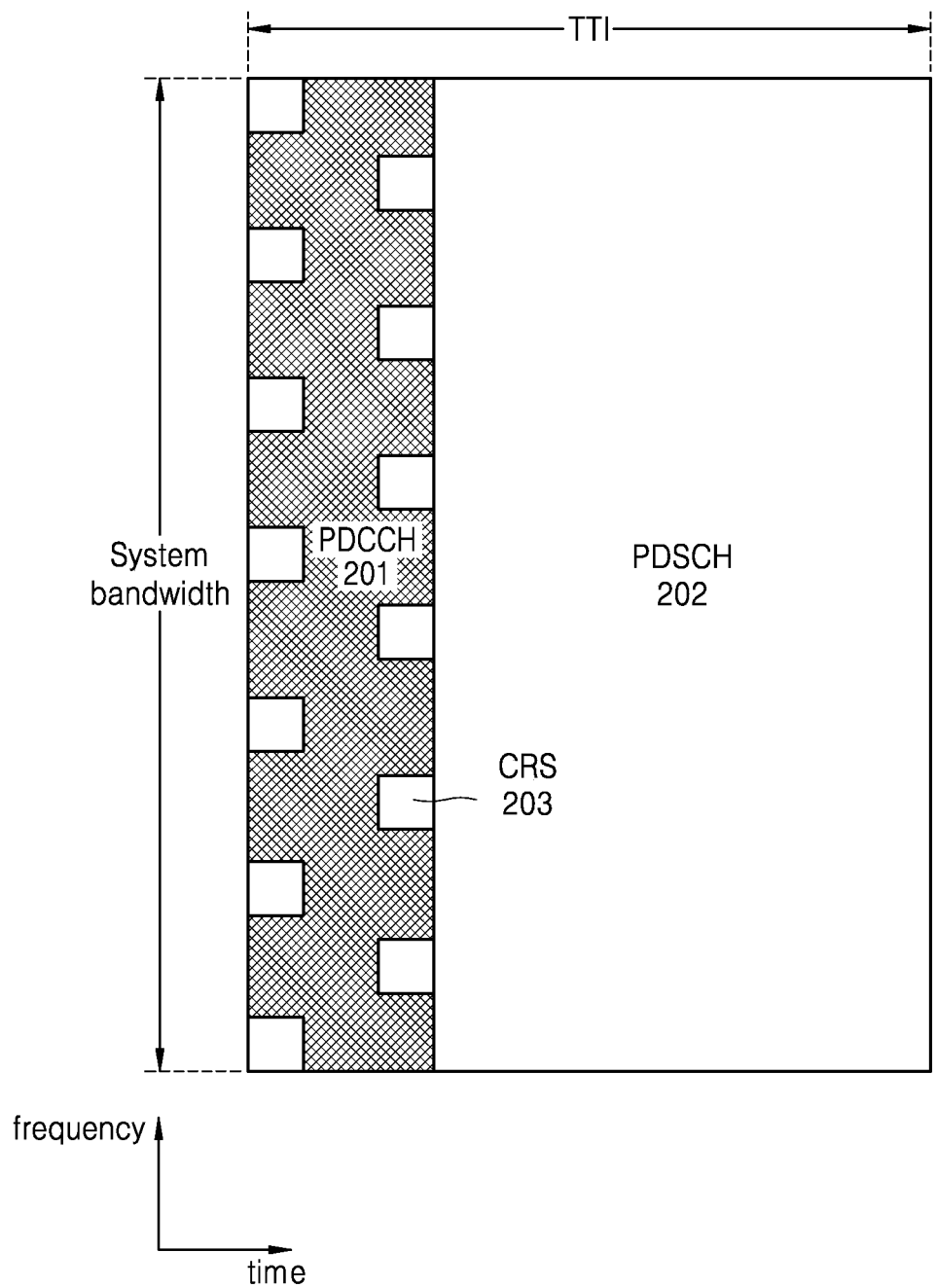
FIG. 2 is a diagram illustrating a physical downlink control channel (PDCCH) via which downlink control information (DCI) is transmitted in the LTE system.

FIG. 2 is a diagram illustrating a PDCCH via which DCI is transmitted in an LTE system.

Referring to FIG. 2, a PDCCH 201 may be time-multiplexed with a physical downlink shared channel (PDSCH) 202 that is a data transmission channel, and may be transmitted over an overall system bandwidth. A region for the PDCCH 201 may be represented with the number of OFDM symbols, which may be indicated to a terminal by a control format indicator (CFI) transmitted through a physical control format indicator channel (PCFICH). The PDCCH 201 may be allocated to the OFDM symbols, which are positioned in the head of a subframe, so that the terminal decodes DL scheduling allocation as soon as possible, and thus decoding latency for a DL shared channel (DL-SCH), that is, overall DL transmission latency, may be reduced. Because one PDCCH may carry one DCI message and multiple terminals may be simultaneously scheduled for a DL and a UL, multiple PDCCHs may be simultaneously transmitted in each cell. A cell-specific reference signal (CRS) 203 may be used as a reference signal for decoding the PDCCH 201. The CRS 203 may be transmitted in each subframe over an entire band and scrambling and resource mapping may vary according to cell identity (ID). UE-specific beamforming may not be used because the CRS 203 is a reference signal commonly used by all terminals. Accordingly, a multi-antenna transmission scheme for LTE PDCCH may be limited to open loop transmit diversity. The number of CRS ports may be implicitly known to the terminal from the decoding of a physical broadcast channel (PBCH).

The resource allocation of the PDCCH 201 may be based on a control-channel element (CCE), and one CCE may include nine resource element groups (REGs), namely, a total of 36 REs.

The number of CCEs required for the PDCCH 201 may be 1, 2, 4, or 8, and may vary according to a channel coding rate of the DCI message Payload. As such, different numbers of CCEs may be used to implement link adaptation of the PDCCH 201. The terminal should detect a signal without knowing information about the PDCCH 201, and LTE defines a search space denoting a set of CCEs for blind decoding. The search space includes a plurality of sets at an aggregation level (AL) of each CCE, which may not be explicitly signaled but implicitly defined by a function and a subframe number by terminal identity. In each subframe, the terminal may decode the PDCCH 201 for all possible resource candidates that may be created from the CCEs in the set search space, and may process information declared through a CRC to be valid for the terminal.

The search space is classified into a UE-specific search space and a common search space. A predetermined group of terminals or all of the terminals may investigate the common search space of the PDCCH 201 in order to receive cell-common control information such as dynamic scheduling or a paging message for system information. For example, scheduling allocation information of the DL-SCH for transmitting system information block (SIB)-1 including cell service provider information or the like may be received by investigating the common search space of the PDCCH 201.

An overall PDCCH region in LTE includes a set of CCEs in a logical region, and there may be a search space including a set of CCEs. The search space may be classified into a common search space and a UE-specific search space, and the search space for LTE PDCCH may be defined as follows.

---

The set of PDCCH candidates to monitor are defined in terms of search spaces, where a search space $S_k^{(L)}$ at aggregation level $L \in \{1,2,4,8\}$ is defined by a set of PDCCH candidates. For each serving cell on which PDCCH is monitored, the CCEs corresponding to PDCCH candidate m of the search space $S_k^{(L)}$ are given by $$L \{(Y_k + m') \mod \lfloor N_{CCE,k}/L \rfloor\} + i$$

where $Y_k$ is defined below, $i = 0,...,L-1$. For the common search space $m' = m$. For the PDCCH UE specific search space, for the serving cell on which PDCCH is monitored, if the monitoring UE is configured with carrier indicator field then $m' = m + M^{(L)} \cdot n_{CI}$ where $n_{CI}$ is the carrier indicator field value, else if the monitoring UE is not configured with carrier indicator field then $m' = m$, where $m = 0,...,M^{(L)} - 1$. $M^{(L)}$ is the number of PDCCH candidates to monitor in the given search space.

Note that the carrier indicator field value is the same as ServCellIndex
For the common search spaces, $Y_k$ is set to 0 for the two aggregation levels $L = 4$ and $L = 8$.

For the UE-specific search space $S_k^{(L)}$ at aggregation level $L$, the variable $Y_k$ is defined by $$Y_k = (A \cdot Y_{k-1}) \mod D$$

where $Y_{-1} = n_{RNTI} \neq 0$, $A = 39827$, $D = 65537$ and $k = \lfloor n_s/2 \rfloor$, $n_s$ is the slot number within a radio frame.

The RNTI value used for $n_{RNTI}$ is defined in subclause 7.1 in downlink and subclause 8 in uplink.

According to the definition of the search space for the above-described PDCCH, the UE-specific search space may not be explicitly signaled but implicitly defined through a function and a subframe number by terminal identity. Because the UE-specific search space may vary according to the subframe number, the UE-specific search space may vary according to time, and thus, a blocking problem in which a particular terminal among terminals may not use the search space due to the other terminals may be solved. When a certain terminal may not be scheduled in a subframe because all CCEs which the certain terminal investigates are already used by other terminals scheduled in the same subframe, such a problem may not occur in a next subframe because the search space varies over time. For example, although UE-specific search spaces of terminal #1 and terminal #2 partially overlap in a particular subframe, the overlap may be expected to be different from that in a next subframe because the UE-specific search spaces vary according to subframes.

According to the definition of the search space for the above-described PDCCH, the common search space may be defined as a set of CCEs that are previously agreed on, because a predetermined group of terminals or all of the terminals should receive a PDCCH. In other words, the common search space may not vary according to, for example, terminal identity or a subframe number. Although the common search space exists for transmission of various system messages, the common search space may be used to transmit control information for individual terminals. Accordingly, the common search space may be used to address the terminal's failure to be scheduled due to insufficient available resources in the UE-specific search space.

The search space is a set of candidate control channels including CCEs which the terminal has to attempt to decode at a given aggregation level, and because there are several aggregation levels for bundling up 1, 2, 4, or 8 CCEs, the terminal may have a plurality of search spaces. The number of PDCCH candidates that the terminal needs to monitor in the search space defined according to the aggregation level in the LTE PDCCH may be defined as shown in Table 1 below.

TABLE 1

Search space $S_k^{(L)}$

| Type | Aggregation level L | Size [in CCEs] | Number of PDCCH candidates $M^{(L)}$ |
|---|---|---|---|
| UE-specific | 1. | 6. | 6. |
| | 2. | 12. | 6. |
| | 4. | 8. | 2. |
| | 8. | 16. | 2. |
| Common | 4. | 16. | 4. |
| | 8. | 16. | 2. |

According to Table 1, the UE-specific search space may support aggregation levels {1, 2, 4, 8}, and may have {6, 6, 2, 2} PDCCH candidates. A common search space may support aggregation levels {4, 8}, and may have {4, 2} PDCCH candidates. The common search space only needs to support the aggregation levels {4, 8} in order to have good coverage characteristics because a system message generally needs to reach a cell edge.

DCI transmitted to the common search space may be defined only for particular DCI formats such as 0/1A/3/3A/1C which are ones for power control purpose for a terminal group or a system message. The common search space does not support a DCI format having spatial multiplexing. A DL DCI format that has to be decoded in the UE-specific search space may vary according to a transmission mode set for the terminal. Because the transmission mode is set through radio resource control (RRC) signaling, an exact subframe number as to whether the setting is effective for the terminal may not be designated. Accordingly, the terminal may operate not to lose communication by always performing decoding on DCI format 1A regardless of the transmission mode.

In the above, a method of transmitting/receiving a DL control channel and DCI and a search space in LTE and LTE-A have been described.

A DL control channel in a 5G communication system which is currently discussed will be described below in more detail with reference to the drawings.

Figure 3:
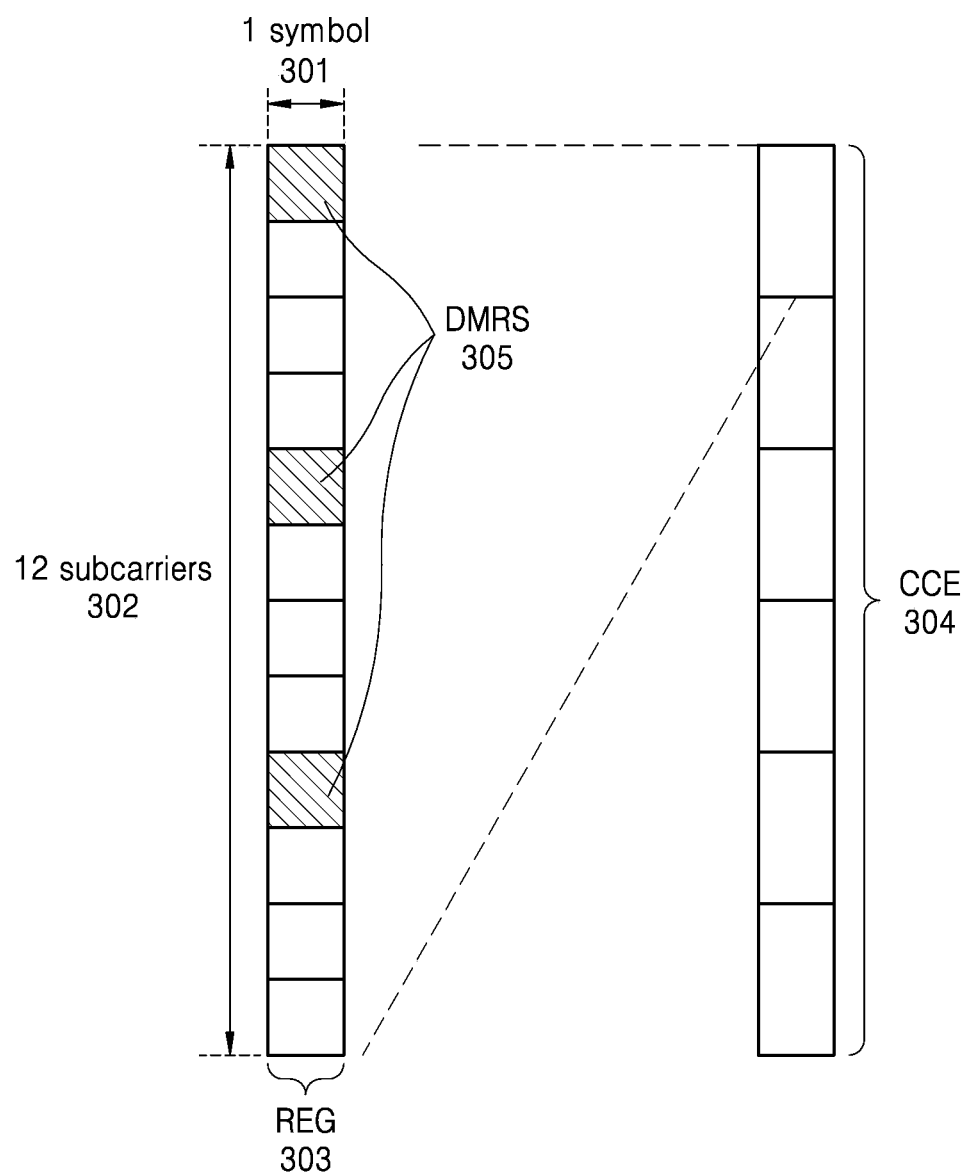
FIG. 3 is a diagram illustrating a downlink (DL) control channel in a $5^{th}$ generation (5G) system.

FIG. 3 is a diagram illustrating a DL control channel in a 5G system.

In other words, FIG. 3 is a diagram illustrating a basic unit of a time-and-frequency resource constituting a DL control channel that may be used in 5G. Referring to FIG. 3, a basic unit (e.g., an REG) of a time-and-frequency resource constituting a control channel may include one OFDM symbol 301 along the time axis, and 12 subcarriers 302, namely, one RB, along the frequency axis. By assuming that one OFDM symbol 301 is a basic unit on the time axis in constituting the basic unit of the control channel, a data channel and a control channel may be time-multiplexed in one subframe. By locating the control channel ahead of the data channel, a user's processing time may be reduced, and thus a latency requirement may be easily satisfied. By setting the basic unit on the frequency axis for the control channel to the subcarriers 302 (i.e., one RB), frequency multiplexing between the control channel and the data channel may be more efficiently performed.

Control channel regions of various sizes may be set by joining REGs 303 of FIG. 3. As an example, when the basic unit in which the DL control channel is allocated in 5G is a CCE 304, one CCE 304 may include multiple REGs 303. For example, when the REG 303 of FIG. 3 includes 12 REs and one CCE 304 includes 6 REGs 303, the CCE 304 may include 72 REs. When the DL control region is set, the DL control region may include multiple CCEs 304, and a particular DL control channel may be mapped to one or more CCEs 304 according to an AL in the control region and may be transmitted. The CCEs 304 in the control region may be distinguished with numbers and the numbers may be assigned according to a logical mapping scheme.

The basic unit, i.e., the REG 303, of the DL control channel of FIG. 3 may contain REs to which DCI is mapped and a region to which a demodulation reference signal (DMRS) 305, as a reference signal for decoding the REs, is mapped. As shown in FIG. 3, the DMRS 305 may be transmitted in three REs in one REG 303. For reference, because the DMRS 305 is transmitted by using the same precoding as a control signal mapped in the REG 303, a terminal may decode control information without information about which precoding is applied by a base station.

Figure 4:
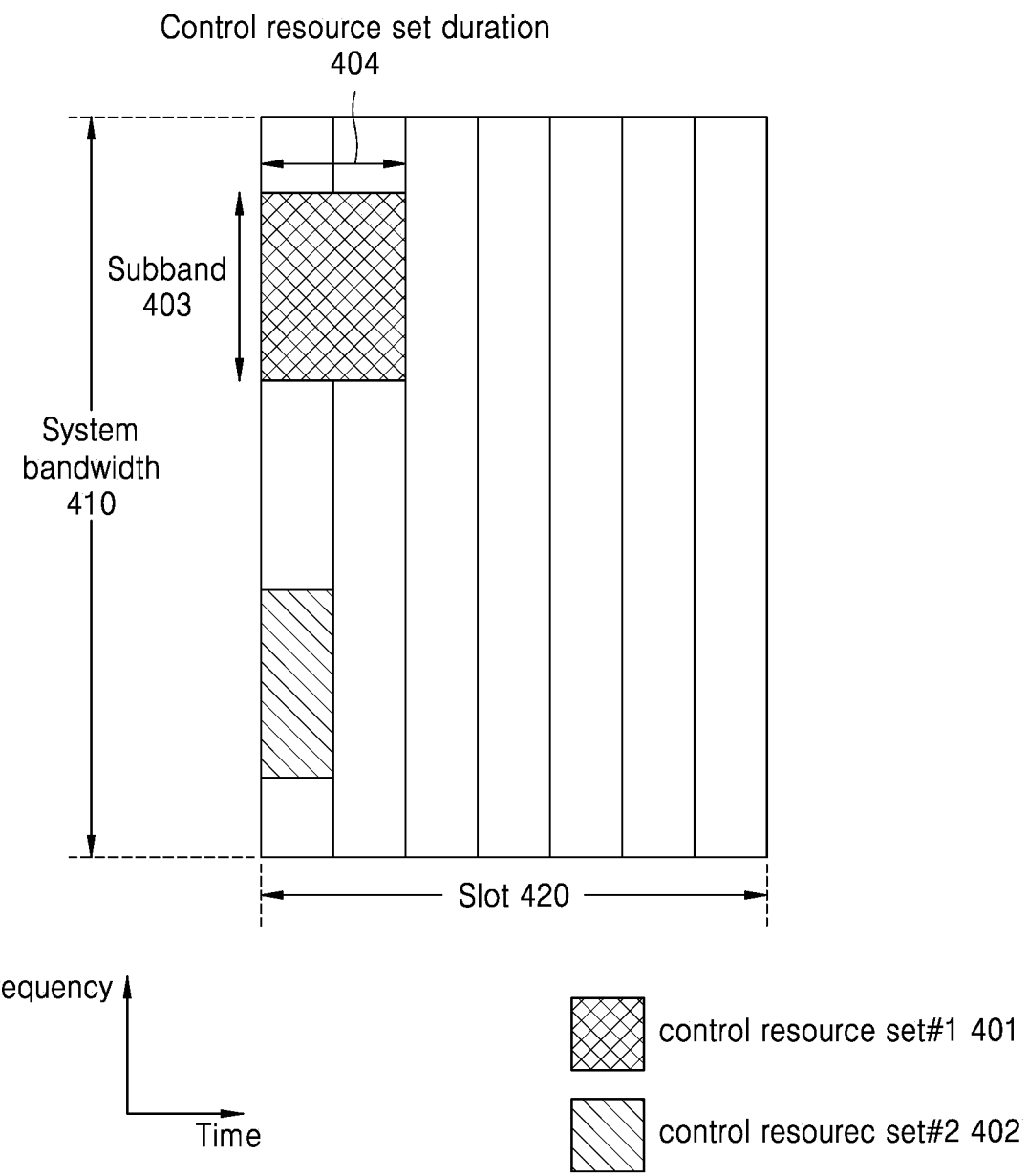
FIG. 4 illustrates a control resource set (CORESET) in a 5G system.

FIG. 4 illustrates a control resource set (CORESET) in the 5G system.

In other words, FIG. 4 is a diagram illustrating a control region where a DL control channel is transmitted in a 5G wireless communication system. Referring to FIG. 4, two control regions (i.e., control resource set #1 401 and control resource set #2 402) are set in one slot 420 on the time axis (assuming that one slot includes seven OFDM symbols in FIG. 4) and a system bandwidth 410 on the frequency axis. The control resource set #1 401 and control resource set #2 402 may be set to a particular subband 403 in the system bandwidth 410 overall on the frequency axis. The control resource set #1 401 and control resource set #2 402 may be set to one or more OFDM symbols on the time axis, which may be defined as a control resource set duration 404. In FIG. 4, the control resource set #1 401 is set to a two-symbol control resource set duration, and the control resource set #2 402 is set to a one-symbol control resource set duration.

The control region in 5G may be set via higher layer signaling (e.g., system information, master information block (MIB), or RRC signaling) from a base station to a terminal. When the control region is set to the terminal, it may mean that information such as a location of the control region, a subband, resource allocation of the control region, and a control resource set duration is provided. For example, configuration information may contain information of Table 2 below.

TABLE 2

- Configuration information 1. frequency-axis RB allocation information
- Configuration information 2. control region start symbol
- Configuration information 3. control resource set duration
- Configuration information 4. REG bundling size (2, 3, or 6)
- Configuration information 5. transmission mode (interleaved transmission scheme or non-interleaved transmission scheme)
- Configuration information 6. DMRS configuration information (precoder granularity)
- Configuration information 7. search space type (common search space, group-common search space, or UE-specific search space)
- Configuration information 8. DCI format to be monitored in corresponding control region
- others Various pieces of information necessary to transmit a DL control channel in addition to the configuration information of Table 2 above may be set to the terminal.

Next, DCI in 5G will be described in detail.

In a 5G system, scheduling information for UL data (e.g., a PUSCH) or DL data (e.g., a PDSCH) may be transmitted from a base station to a terminal through DCI. The terminal may monitor a fallback DCI format and a non-fallback DCI format for a PUSCH or a PDSCH. The fallback DCI format may include a field fixed between the base station and the terminal, and the non-fallback DCI format may include a configurable field.

Fallback DCI for scheduling the PUSCH may include information of Table 3.

TABLE 3

- Identifier for DCI formats - [1] bit
- Frequency domain resource assignment -$\lceil \log_2(N_{RB}^{UL,BWP}(N_{RB}^{UL,BWP} + 1)/2) \rceil$ ] bits
- Time domain resource assignment - X bits
- Frequency hopping flag - 1 bit.
- Modulation and coding scheme - [5] bits
- New data indicator - 1 bit
- Redundancy version - [2] bits
- HARQ process number - [4] bits
- TPC command for scheduled PUSCH - [2] bits
- UL/SUL indicator - 0 or 1 bit Non-fallback DCI for scheduling the PUSCH may include information of Table 4.

TABLE 4

- Carrier indicator – 0 or 3 bits
- Identifier for DCI formats – [1] bits
- Bandwidth part indicator – 0, 1 or 2 bits
- Frequency domain resource assignment
  • For resource allocation type 0, $\lceil N_{RB}^{UL,BWP}/P \rceil$ bits
  • For resource allocation type 1, $\lceil \log_2(N_{RB}^{UL,BWP}(N_{RB}^{UL,BWP} + 1)/2) \rceil$ bits
- Time domain resource assignment –1, 2, 3, or 4 bits TABLE 4-continued

- VRB-to-PRB mapping – 0 or 1 bit, only for resource allocation type 1.
  • 0 bit if only resource allocation type 0 is configured;
  • 1 bit otherwise.
- Frequency hopping flag – 0 or 1 bit, only for resource allocation type 1.
  • 0 bit if only resource allocation type 0 is configured;
  • 1 bit otherwise.
- Modulation and coding scheme – 5 bits
- New data indicator – 1 bit
- Redundancy version – 2 bits as defined in section x.x of [6, TS38.214]
- HARQ process number – 4 bits TABLE 4-continued

- 1st downlink assignment index – 1 or 2 bits
  • 1 bit for semi-static HARQ-ACK codebook;
  • 2 bits for dynamic HARQ-ACK codebook with single HARQ-ACK codebook.
- 2nd downlink assignment index – 0 or 2 bits
  • 2 bits for dynamic HARQ-ACK codebook with two HARQ-ACK sub-codebooks;
  • 0 bit otherwise.
- TPC command for scheduled PUSCH – 2 bits TABLE 4-continued

- SRS resource indicator – $\left\lceil \log_2\left(\sum_{k=1}^{L_{max}} \binom{N_{SRS}}{k}\right)\right\rceil$ or $\lceil \log_2(N_{SRS})\rceil$ bits

• $\left\lceil \log_2\left(\sum_{k=1}^{L_{max}} \binom{N_{SRS}}{k}\right)\right\rceil$ bits for non–codebook based PUSCH transmission;

• $\lceil \log_2(N_{SRS})\rceil$ bits for codebook based PUSCH transmission.
- Precoding information and number of layers –up to 6 bits
- Antenna ports – up to 5 bits
- SRS request – 2 bits TABLE 4-continued

- CSI request – 0, 1, 2, 3, 4, 5, or 6 bits
- CBG transmission information – 0, 2, 4, 6, or 8 bits
- PTRS-DMRS association – 2 bits.
- beta_offset indicator – 2 bits
- DMRS sequence initialization – 0 or 1 bit
- UL/SUL indicator – 0 or 1 bit The fallback DCI for scheduling the PDSCH may include information of Table 5.

TABLE 5

- Identifier for DCI formats - [1] bit
- Frequency domain resource assignment -[$\lceil \log_2(N_{RB}^{DL,BWP}(N_{RB}^{DL,BWP} + 1)/ 2) \rceil$] bits
- Time domain resource assignment - X bits
- VRB-to-PRB mapping - 1 bit.
- Modulation and coding scheme - [5] bits
- New data indicator - 1 bit
- Redundancy version - [2] bits
- HARQ process number - [4] bits
- Downlink assignment index - 2 bits
- TPC command for scheduled PUCCH - [2] bits
- PUCCH resource indicator - [2] bits
- PDSCH-to-HARQ feedback timing indicator - [3] bits The non-fallback DCI for scheduling the PDSCH may include information of Table 6.

TABLE 6

- Carrier indicator - 0 or 3 bits
- Identifier for DCI formats - [1] bits
- Bandwidth part indicator - 0, 1 or 2 bits
- Frequency domain resource assignment
  - ● For resource allocation type 0, $\lceil N_{RB}^{DL,BWP} / P \rceil$ bits
  - ● For resource allocation type 1, $\lceil \log_2(N_{RB}^{DL,BWP}(N_{RB}^{DL,BWP} + 1)/ 2) \rceil$ bits
- Time domain resource assignment -1, 2, 3, or 4 bits
- VRB-to-PRB mapping - 0 or 1 bit, only for resource allocation type 1.
  - ● 0 bit if only resource allocation type 0 is configured;
  - ● 1 bit otherwise.
- PRB bundling size indicator - 1 bit
- Rate matching indicator - 0, 1, 2 bits
- ZP CSI-RS trigger - X bits For transport block 1:
- Modulation and coding scheme - 5 bits
- New data indicator - 1 bit
- Redundancy version - 2 bits For transport block 2:
- Modulation and coding scheme - 5 bits
- New data indicator - 1 bit
- Redundancy version - 2 bits
- HARQ process number - 4 bits
- Downlink assignment index - 0 or 4 bits
- TPC command for scheduled PUCCH - 2 bits
- PUCCH resource indicator
- PDSCH-to-HARQ_feedback timing indicator - 3 bits
- Antenna ports - up to 5 bits
- Transmission configuration indication - 3 bits
- SRS request - 2 bits
- CBG transmission information - 0, 2, 4, 6, or 8 bits
- CBG flushing out information - 0 or 1 bit
- DMRS sequence initialization - 0 or 1 bit The above-described DCI may be transmitted through a PDCCH through channel coding and modulation. A CRC may be attached to the payload of a DCI message Payload, and may be scrambled by an RNTI corresponding to terminal identity. Different RNTIs may be used according to the purpose of the DCI message, e.g., UE-specific data transmission, power control command, or random access response. Soon, the RNTI may not be explicitly transmitted but may be transmitted by being included in a CRC computation process. Upon receiving the DCI message transmitted onto the PDCCH, the terminal may check the CRC using the allocated RNTI. When a confirmation result of the CRC is correct, the terminal may determine that the DCI message is transmitted to the terminal.

For example, DCI for scheduling a PDSCH for system information (SI) may be scrambled by an SI-RNTI. DCI for scheduling a PDSCH for a random access response (PAR) message may be scrambled by an RA-RNTI. DCI for scheduling a PDSCH for a paging message may be scrambled by a P-RNTI. DCI for notifying a slot format indicator (SFI) may be scrambled by an SFI-RNTI. DCI for notifying a transmit power control (TPC) may be scrambled by a TPC-RNTI. DCI for scheduling a UE-specific PDSCH or PUSCH may be scrambled by a cell RNTI (C-RNTI).

When a data channel, that is, a PUSCH or a PDSCH, is scheduled to a particular terminal through a PDCCH, data in a scheduled resource region may be transmitted/received along with a DMRS.

Figure 5:
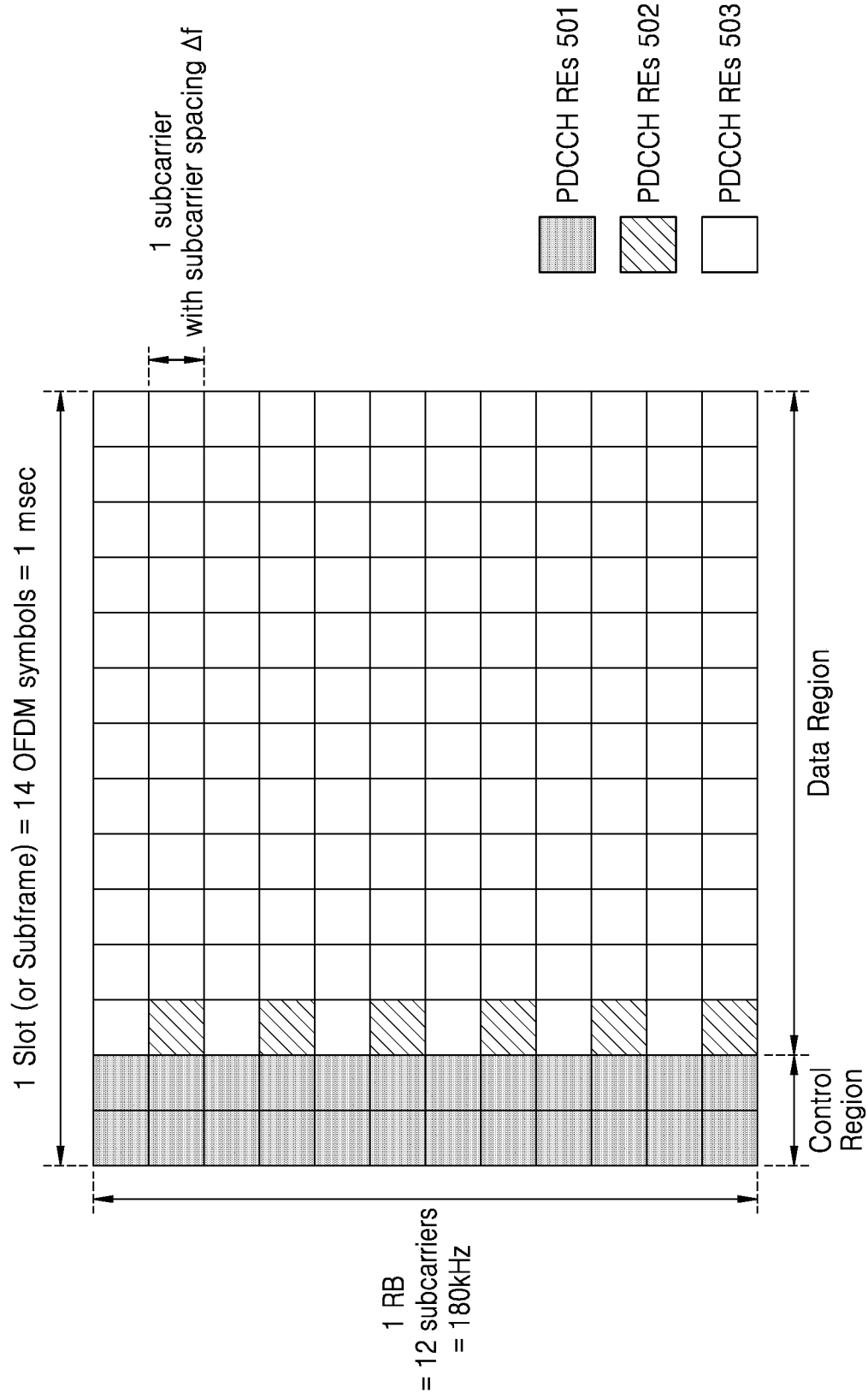
FIG. 5 is a diagram illustrating a time-frequency resource domain where a DL signal is transmitted, according to an embodiment of the disclosure.

FIG. 5 is a diagram illustrating a time-frequency resource domain where a DL signal is transmitted, according to an embodiment of the disclosure.

In other words, FIG. 5 illustrates a case where, in a DL, a particular terminal uses 14 OFDM symbols as one slot (or subframe), and is configured so that a PDCCH is transmitted in initial two OFDM symbols and a DMRS is transmitted in a third symbol. In FIG. 5, a PDSCH in a specific RB to which the PDSCH is scheduled may be transmitted so that data is mapped to REs where the DRMS is not transmitted in the third symbol and REs ranging from a fourth symbol to a last symbol. A subcarrier spacing Δf of FIG. 5 may be 15 kHz in the LTE/LTE-A system, and may be one of {15, 30, 60, 120, 240, 480} kHz in the 5G system.

As described above, in a cellular system, a base station has to transmit a reference signal in order to measure a DL channel state. In a 3GPP LTE-A system, a terminal may measure a channel state between the base station and the terminal by using a CRS or a channel state information reference signal (CSI-RS) transmitted from the base station. The channel state has to be measured considering several factors, and may include the amount of interference in a DL. The amount of interference in the DL may include an interference signal and thermal noise generated by antennas belonging to the adjacent base station, and is important in order for the terminal to determine a channel condition of the DL. When the base station having one transmission antenna transmits a signal to the terminal having one reception antenna, the terminal should determine energy per symbol that may be received in the DL and the amount of interference to be simultaneously received in a section where the corresponding symbol is received, by using the reference signal received from the base station, and should determine $E_s/I_0$. In other words, according to an embodiment, $E_s/I_0$ may indicate a ratio between the energy per symbol $E_s$ that may be received by the DL and the amount of interference $I_0$ to be simultaneously received to correspond to reception of the corresponding symbol. The determined Es/Io may be converted into a data transmission speed or a value corresponding to the data transmission speed, and may be transmitted to the base station in the form of a channel quality indicator (CQI) to enable the base station to determine at what data transmission speed the base station is to perform data transmission to the terminal.

In the LTE-A system, the terminal may feed information about the channel state of the DL back to the base station so that the base station uses the information during DL scheduling. In other words, the terminal may measure the reference signal transmitted by the base station in the DL and feed information extracted from the reference signal back to the base station in the form defined in the LTE and LTE-A standards. The information which the terminal feeds back in LTE-LTE-A as described above may be referred to as channel state information, and the channel state information may include the following three pieces of information.

Rank indicator (RI): the number of spatial layers that may be received by the terminal in a current channel state.
Precoding matrix indicator (PMI): an indicator of a precoding matrix preferred by the terminal in the current channel state.
CQI: a maximum data rate at which the terminal may receive data in the current channel state.

The CQI may be replaced by a signal to interference plus noise ratio (SINR) that may be used similarly to the maximum data rate, a maximum error correction code rate and modulation scheme, and data efficiency per frequency.

The above-described RI, PMI, and CQI have meanings in association with one another. For example, a precoding matrix supported in LTE/LTE-A is differently defined per rank. Accordingly, a PMI value X when the RI has a value of 1 and the PMI value X when the RI has a value of 2 may be differently interpreted. Also, it is assumed that the PMI value X reported by the terminal to the base station is applied to the base station even when the terminal determines the CQI. In other words, when the RI is RI_X and the PMI is PMI_Y in the case where the terminal reports RI_X, PMI_Y, and CQI_Z to the base station, it may mean that the terminal may receive a data rate corresponding to the CQI_Z. As such, the terminal may assume in what transmission method the terminal performs transmission to the base station when calculating the CQI, and may obtain an optimum performance when performing actual transmission in the corresponding transmission method.

The RI, PMI, and CQI that are the channel state information fed back by the terminal in LTE/LTE-A may be fed back periodically or non-periodically. When the base station is to non-periodically obtain the channel state information of the particular terminal, the base station may be set to perform aperiodic feedback (or aperiodic channel state information report) by using an aperiodic feedback indicator (or channel state information request field, channel state information request information) included in DCI for the terminal. Also, when the terminal receives the indicator set to perform the aperiodic feedback in an nth subframe, the terminal may perform UL transmission by including aperiodic feedback information (or channel state information) in data transmission in an (n+k)th subframe. Here, k that is a parameter defined in the 3GPP LTE Release 11 standard may be 4 in frequency division duplexing (FDD), and may be defined as shown in Table 7 in time division duplexing (TDD).

TABLE 7

| TDD UL/DL Configuration | subframe number n | | | | | | | | | |
|---|---|---|---|---|---|---|---|---|---|---|
| | 0. | 1. | 2. | 3. | 4. | 5. | 6. | 7. | 8. | 9. |
| 0. | — | — | 6. | 7. | 4. | — | — | 6. | 7. | 4. |
| 1. | — | — | 6. | 4. | — | — | — | 6. | 4. | — |
| 2. | — | — | 4. | — | — | — | — | 4. | — | — |
| 3. | — | — | 4. | 4. | 4. | — | — | — | — | — |
| 4. | — | — | 4. | 4. | — | — | — | — | — | — |
| 5. | — | — | 4. | — | — | — | — | — | — | — |
| 6. | — | — | 7. | 7. | 5. | — | — | 7. | 7. | — |

Table 7 may mean a k value for each subframe number n in TDD UL/DL configuration.

When the aperiodic feedback is set, feedback information (or the channel state information) may include the RI, PMI, and CQI, and the RI and PMI may not be fed back according to feedback configuration (or channel state report configuration).

A method and apparatus for performing beam management and feedback of a 2-stage antenna structure, according to an embodiment of the disclosure, will now be described.

Accordingly, embodiments of the disclosure provide a method and apparatus for effectively performing beam management and feedback of a 2-stage antenna structure in a wireless communication system.

In a 6th generation (6G) mobile communication system after 5G, a superhigh frequency band such as a millimeter wave band or a Terahertz band may be utilized to secure a deficient bandwidth. Loss due to a path loss of a wave is large in the superhigh frequency band, and the magnitude of a wave that is reflected or transmitted may rapidly drop in the superhigh frequency band, compared with frequencies for previous mobile communication (frequency of 6 GHz or less such as an ultra high frequency (UHF) band or a very high frequency (VHF) band). Beamforming using a plurality of antennas (hereinafter, beamforming) may be utilized to alleviate such a wave path loss and increase a reception distance of a wave. A terminal or a base station may orient a beam in a specific direction by further using an analog and digital signal processing technique in addition to a plurality of antenna. However, additional high frequency signal processing components such as a phase shifter, a power amplifier, and a mixer are necessary to adjust the orientation angle of a beam. Because these high frequency signal processing components consume power, as the number of high frequency signal processing components increases for each antenna, more energy may be additionally consumed to achieve beamforming and beam orientation.

In the disclosure, a metamaterial may refer to a material made to induce specific electromagnetic characteristics due to the geometric characteristics of the physical properties arranged in an artificial structure. A metasurface is a general term for an object made of a metamaterial in a two-dimensional planar structure. In communication systems, the metasurface has been being studied as a component that constitutes a lens antenna. In detail, the metasurface may uniformly or non-uniformly arrange unit cells in a plane shape at a distance shorter than the wavelength of a wave radiated by an antenna, and thus a phase difference may be generated in the waves incident upon the unit cells of the metasurface. The metasurface may re-radiate the waves incident upon the unit cells of the metasurface by using this phase difference. Thus, when unit cells are designed and arranged at an appropriate location, beamforming may be used to collect the waves radiated by an antenna, and a beam orientation angle may be adjusted. Accordingly, when a structure of a metamaterial surface for collecting the waves radiated by a specific antenna by using a metasurface is designed, the structure may be utilized as a device that alleviates a wave path loss in a high frequency band. Such a device that alleviates a wave path loss in the high frequency band by using the metamaterial surface may be referred to as a metamaterial lens or a metasurface lens. Hereinafter, the device that alleviates a wave path loss in the high frequency band by using the metamaterial surface is referred to as a metamaterial lens. When the metamaterial lens is used together with an antenna, a higher beam gain may be obtained than when only an antenna is used. However, an existing metamaterial lens is difficult to change once its design is fixed, and thus may be difficult to perform free beam management necessary for a mobile communication system, such as adjustment of a beam orientation angle or adjustment of a beam width.

Accordingly, a programmable metamaterial lens capable of adjusting the characteristics of a metamaterial lens has been recently introduced. For example, a metamaterial lens capable of adjusting a beam orientation angle or adjusting a beam width through a program, in contrast with an existing metamaterial lens, has been being researched. Therefore, when this programmable metamaterial lens is used, a new level of beam adjustment function together with a beam adjustment function utilizing an existing high frequency signal processing apparatus and method may be possible. The disclosure provides a method of managing and processing, in a mobile communication system, a channel feedback method and a beam determination method and apparatus when a 2-stage beamforming system using this programmable metamaterial lens has been applied. A metamaterial lens according to an embodiment of the disclosure to be described later may refer to the above-described programmable metamaterial lens.

Embodiments of the disclosure will now be described more fully with reference to the accompanying drawings. Although embodiments of the disclosure are hereinafter described with respect to an LTE or LTE-A system, the embodiments of the disclosure may be applied to other communication systems having similar technical backgrounds and channel configurations. For example, the embodiments of the disclosure may be applied to 5G mobile communication technology (e.g., 5G NR) developed after LTE-A. Accordingly, it should be understood by those skilled in the art that the embodiments of the disclosure are applicable to other communication systems though modifications not departing from the scope of the disclosure.

Figure 6:
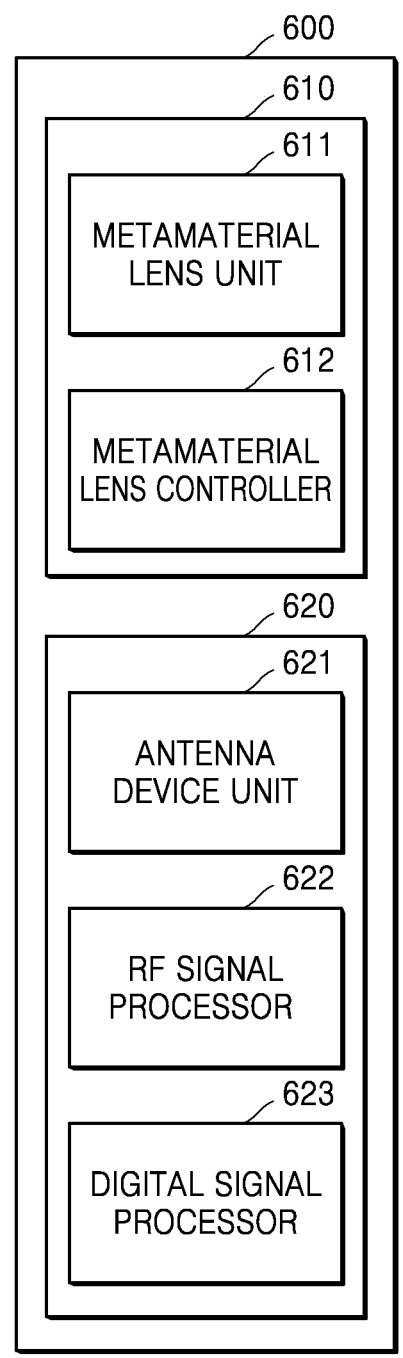
FIG. 6 is a block diagram of a structure of a transceiver of a terminal or a base station according to an embodiment of the disclosure.

FIG. 6 is a block diagram of a structure of a transceiver 600 of a terminal or a base station according to an embodiment of the disclosure.

Referring to FIG. 6, the transceiver 600 may include a metamaterial unit 610 and an antenna unit 620. According to an embodiment, the metamaterial unit 610 may include a metamaterial lens unit 611 and a metamaterial lens controller 612. According to an embodiment, the antenna unit 620 may include an antenna device unit 621, a radio frequency (RF) signal processor 622, and a digital signal processor 623. However, the components of the transceiver 600 are not limited to the above-described components, and some components may be omitted from the components illustrated in FIG. 6 or a new component may be added to the components illustrated in FIG. 6.

According to an embodiment, when the metamaterial lens unit 611 and the antenna device unit 621 are physically separated from each other and the wavelength of a wave is, λ the metamaterial lens unit 611 and the antenna device unit 621 may be apart from each other by a distance of several λ to several tens of, λ and thus the wave may be transmitted or received via the metamaterial lens unit 611 and the antenna device unit 621. This structure may be hereinafter referred to as a metamaterial lens antenna structure. In the metamaterial lens antenna structure, a distance between the metamaterial lens unit 611 and the antenna device unit 621 may vary according to several conditions such as a use frequency and a transmission and reception power intensity of the system of the transceiver 600 and the antenna of the terminal or the base station.

According to an embodiment, the metamaterial lens controller 612 may adjust the physical characteristics of the metamaterial lens unit 611. For example, the metamaterial lens controller 612 may adjust the propagation direction and the propagation intensity of a wave that pass through the metamaterial lens unit 611 by using an electrical or mechanical signal. In other words, the metamaterial lens controller 612 may adjust the characteristics of an incident beam incident upon the metamaterial lens unit 611 and then re-radiate the incident beam. According to an embodiment, the metamaterial lens controller 612 may perform the adjustment independently from or dependently upon the antenna unit 620 of the transceiver 600.

According to an embodiment, the metamaterial lens unit 611 may refer to the above-described programmable metamaterial lens or a group of the above-described programmable metamaterial lenses. The metamaterial lens unit 611 may be obtained by arranging a plurality of unit cells capable of refracting or reflecting an incident wave by adjusting the phase and the amplitude of the incident wave in a 2D or 3D manner at a distance of λ or less, or may be obtained by partially modifying the 2D or 3D arrangement of the unit cells. According to an embodiment, each unit cell may be generated from a metamaterial such as a metal or dielectric having an artificial structure. The design of the metamaterial lens unit 611 may vary according to the use frequency and the use power intensity of the system of the transceiver 600 and the structure and characteristics of the antenna device unit 621.

According to an embodiment, the metamaterial lens unit 611 and the metamaterial lens controller 612 may be different devices that are connected to each other via a conducting wire or the metamaterial lens unit 611 and the metamaterial lens controller 612 may be integrated with each other. Each unit cell may refer to a type including not only the above-described function of refracting or reflecting an incident wave but also a device and a function that adjust the size of a refraction angle or reflection angle of the incident wave. The metamaterial lens controller 612 may individually adjust a refracted or reflected wave for each unit cell. The metamaterial lens controller 612 may control, collectively, the entire metamaterial lens unit 611 including a plurality of unit cells.

According to an embodiment, the antenna device unit 621 may include a component that converts a current into a wave and radiate the wave or converts a wave into a current. The antenna device unit 621 may be a single antenna device, all of several antenna devices, or some of the several antenna devices. The RF signal processor 622 may include both an analog precoding device and an analog precoding system that control the phase, amplitude, and the like of an RF signal into which a baseband signal is converted via a carrier frequency. The digital signal processor 623 may include all of a device and a system that perform layer mapping and digital precoding on a baseband data stream. The RF signal processor 622 and the digital signal processor 623 may independently operate or organically operate. An operation of transmitting a beam in a specific direction via an overall operation of the antenna device unit 621 may be hereinafter referred to as hybrid beamforming.

The disclosure proposes an efficient channel feedback and beam determination method of the transceiver 600 in which the direction and intensity of a signal that is transmitted or received may be adjusted by changing the physical characteristics of the metamaterial lens unit 611 by using the above-described metamaterial lens controller 612. According to an embodiment, a lens antenna structure through a passive metamaterial lens may exist for metamaterial lenses. The passive metamaterial lens may refer to a lens that receives a wave radiated by a feed antenna through a metamaterial lens including several unit cells and focuses the wave in a predesigned direction. Because a lens profile of the passive metamaterial lens, such as a direction in which a wave may be transmitted and a lens gain, is fixed, it is impossible to adjust the intensity or direction of a beam.

There may be an active metamaterial obtained by addressing the limitations of the passive metamaterial lens. The active metamaterial may change the characteristics of a unit cell by applying an electrical signal or other controllable signal, such as a voltage or a current, to the unit cell. The changed unit cell may enable a lens including an active metamaterial to adjust the intensity or direction of a beam in contrast with the passive metamaterial lens. Accordingly, the disclosure proposes an efficient beamforming method in a transmission and reception sub-system of a terminal or a base station when the lens including the active metamaterial is a programmable metamaterial lens. Therefore, according to an embodiment of the disclosure, the metamaterial unit 610 may include a programmable metamaterial lens structure or may include an active metamaterial lens structure in which the intensity or direction of a wave is adjustable in a method other than a programming method, and a control circuit.

The transceiver 600 not including the metamaterial unit 610 but including only the antenna unit 620 may use hybrid beamforming through the RF signal processor 622 and the digital signal processor 623 in order to adjust the transmission and reception direction and transmission and reception range of a wave, a formation range of a beam, and the orientation intensity of the wave. The disclosure proposes an operation method in a transceiver of a terminal or a base station not including the metamaterial unit 610 but including only the antenna unit 620 and an operation method in a structure including both the metamaterial unit 610 and the antenna unit 620 such that a beam is formed in two stages (ok?). According to an embodiment, an antenna arrangement of the antenna device unit 621 may include all antennas used in a transceiver of a general terminal and a general base station, such as a single omnidirectional antenna and a single directional antenna.

According to an embodiment, the metamaterial lens unit 610 and the antenna unit 620 may differ in terms of a physical orientation direction of a beam, a beam width, a beam control speed, and the like. Such a wireless communication system may need an efficient beam sweeping process to quickly and accurately search for a valid beam between a base station and a terminal. An example of the transceiver 600 of the terminal or the base station of FIG. 6 will now be described with reference to FIG. 7.

Figure 7:
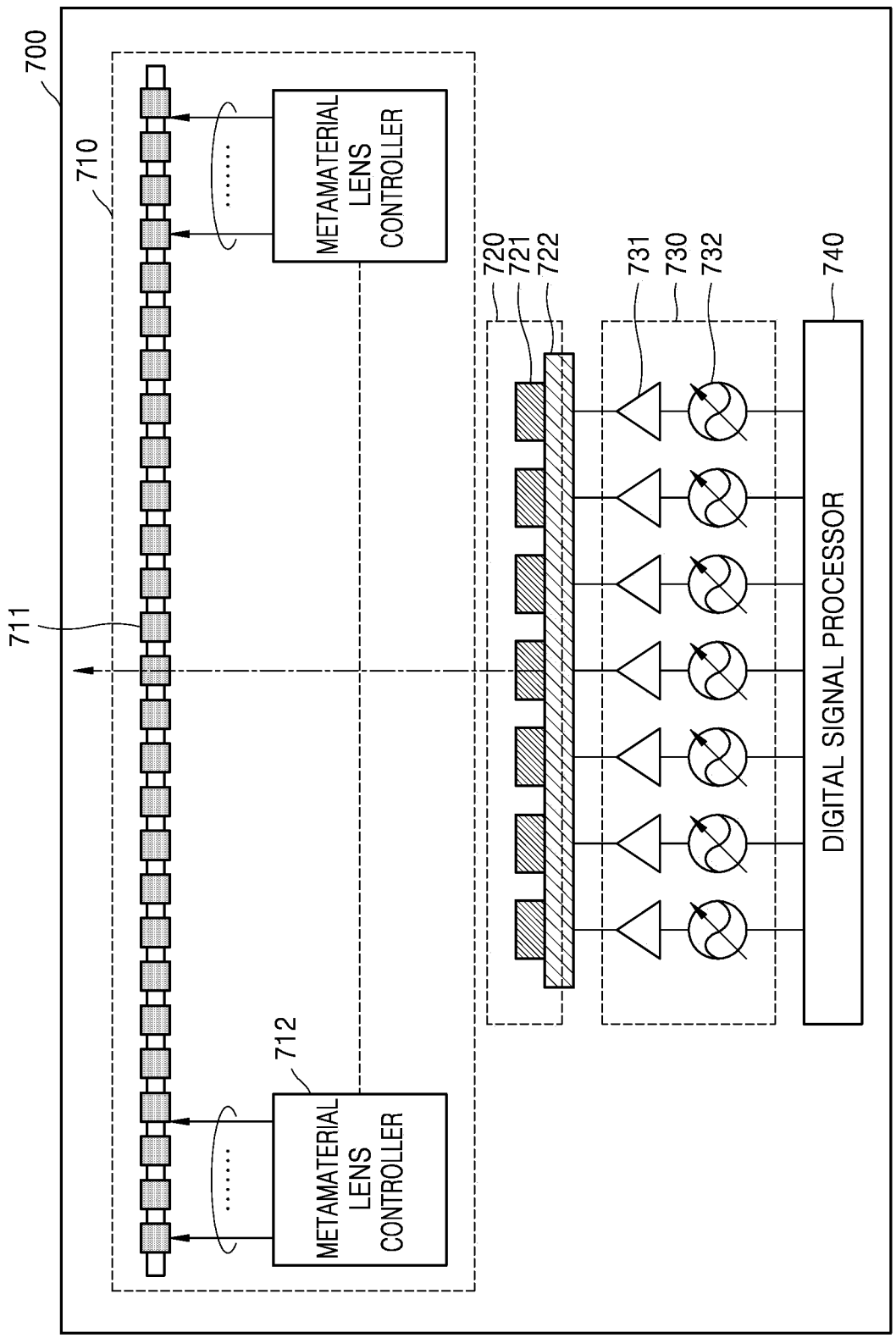
FIG. 7 is a block diagram of a transceiver of a terminal or a base station according to an embodiment of the disclosure.

FIG. 7 is a block diagram of a transceiver 700 of a terminal or a base station according to an embodiment of the disclosure.

Referring to FIG. 7, the transceiver 700 may be divided into a metamaterial unit 710 and an antenna unit 720 as described above. The transceiver 700 of FIG. 7 may correspond to the transceiver 600 of FIG. 6, and the metamaterial unit 710 of FIG. 7 may correspond to the metamaterial unit 610 of FIG. 6. The antenna unit 720 of FIG. 7 may correspond to the antenna unit 620 of FIG. 6, metamaterial lens units 711 of FIG. 7 may correspond to the metamaterial lens unit 611 of FIG. 6, and a metamaterial lens controller 712 of FIG. 7 may correspond to the metamaterial lens controller 612 of FIG. 6. An antenna device unit 721 of FIG. 7 may correspond to the antenna device unit 621 of FIG. 6. An analog signal processor 730 of FIG. 7 may correspond to the RF signal processor 622 of FIG. 6, and a digital signal processor 740 of FIG. 7 may correspond to the digital signal processor 623 of FIG. 6.

According to an embodiment, the metamaterial unit 710 may include the metamaterial lens units 711 including a group of unit cells, and the metamaterial lens controller 712. According to an embodiment, the metamaterial lens units 711 and the antenna unit 720 may be spaced apart from each other by a preset distance. The preset distance may be adjusted via an electrical or mechanical control signal. The metamaterial lens controller 712, which changes the characteristics of a metamaterial capable of determining the intensity, direction, and amplitude of a beam, may be connected to the metamaterial lens units 711. The metamaterial lens controller 712 may be connected to the metamaterial lens units 711 via a conductive wire.

The metamaterial lens controller 712 may generate all control signals capable of changing beamforming characteristics of a metamaterial, such as not only an electrical control signal but also an optical or chemical control signal, and may transmit the generated control signals to the metamaterial lens units 711. The metamaterial lens controller 712 may individually control the metamaterials of the metamaterial lens units 711, or may perform control by transmitting a control signal for each group of metamaterial lens units 711. For example, a plurality of metamaterial lens controllers 712 may control each unit cell within the metamaterial lens unit 711, or may control a plurality of unit cells within the metamaterial lens unit 711.

According to an embodiment, the antenna unit 720 may include an antenna device unit 721, and a substrate 722 for fixing the antenna device unit 721. The antenna unit 720 may be connected to the analog signal processor 730 and the digital signal processor 740. The analog signal processor 730 may include a system and a device for processing an RF signal, such as a power amplifier 731 for increasing transmission power, a phase shifter 732 for beam adjustment, and a digital-to-analog converter (DAC). The digital signal processor 740 may include a system and a device for processing a transmission and reception signal in a baseband, such as source coding and channel coding and modulation.

Embodiments of the disclosure of managing a beam by using a 2-stage antenna structure including the above-described metamaterial unit and the above-described antenna unit will now be described with reference to FIGS. 8 through 13.

Figure 8:
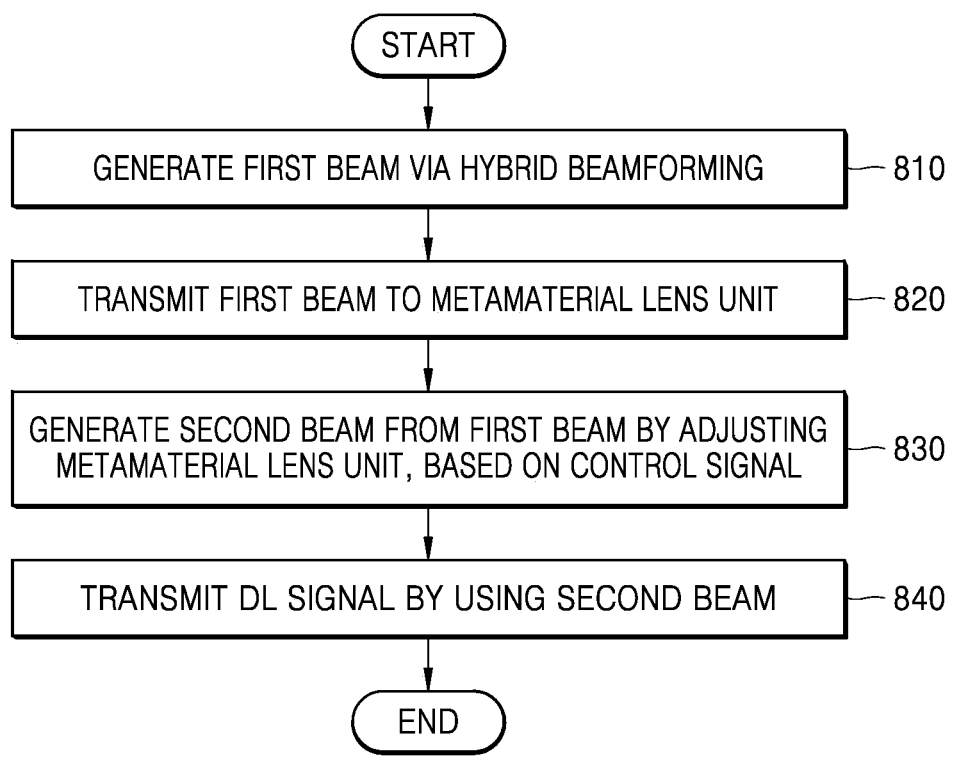
FIG. 8 is a flowchart of an operation method of a base station, according to an embodiment of the disclosure.

FIG. 8 is a flowchart of an operation method of a base station, according to an embodiment of the disclosure.

Referring to FIG. 8, in operation 810, the base station may generate a first beam via hybrid beamforming. According to an embodiment, hybrid beamforming may refer to a method of generating a beam traveling in a specific direction by independently or dependently combining analog beamforming and digital beamforming, or adjusting a beam in the specific direction. For example, the analog beamforming may be performed by the analog signal processor 730 of FIG. 7, and the digital beamforming may be performed by the digital signal processor 740 of FIG. 7.

In operation 820, the base station may transmit the first beam to the metamaterial lens unit. In other words, the base station may transmit the first beam generated via the hybrid beamforming to the metamaterial lens unit via the antenna unit. Alternatively, the base station may radiate the first beam to the metamaterial lens unit via the antenna unit. According to an embodiment, the first beam may refer to a plurality of beams or a single beam.

In operation 830, the base station may generate a second beam from the first beam by adjusting the metamaterial lens unit, based on a control signal. For example, the base station may generate a control signal for controlling the metamaterial lens unit, by using a metamaterial lens controller. The base station may generate the control signal, based on information about beam properties of the first beam, by using the metamaterial lens controller. According to an embodiment, information about beam properties of a beam may include the intensity of the beam, the direction thereof, the width thereof, or the like. Accordingly, the base station may adjust the metamaterial lens unit by transmitting to the metamaterial lens unit the control signal generated based on the information about beam properties of the first beam by the metamaterial lens controller. The beam properties of the first beam incident upon the metamaterial lens unit adjusted by the control signal may be changed to generate the second beam.

In operation 840, the base station may transmit a DL signal by using the second beam. For example, the base station may transmit a DL control signal, such as a synchronization signal block (SSB) or CSI-RSs or demodulation reference signals (DM-RSs), to a terminal via the second beam generated by using the metamaterial lens. However, the type of DL signal that may be transmitted by the base station is not limited thereto.

According to an embodiment, the operation of the base station described above with reference to FIG. 8 may be performed by the terminal. For example, the terminal may generate the second beam by using the metamaterial lens via operations 810 through 830. The terminal may transmit an UL signal to the base station by using the second beam. For example, the UL signal may include, but is not limited to, a signal for CSI report.

The method of FIG. 8 of generating the second beam from the first beam by adjusting the metamaterial lens will now be described in greater detail with reference to FIG. 9.

Figure 9:
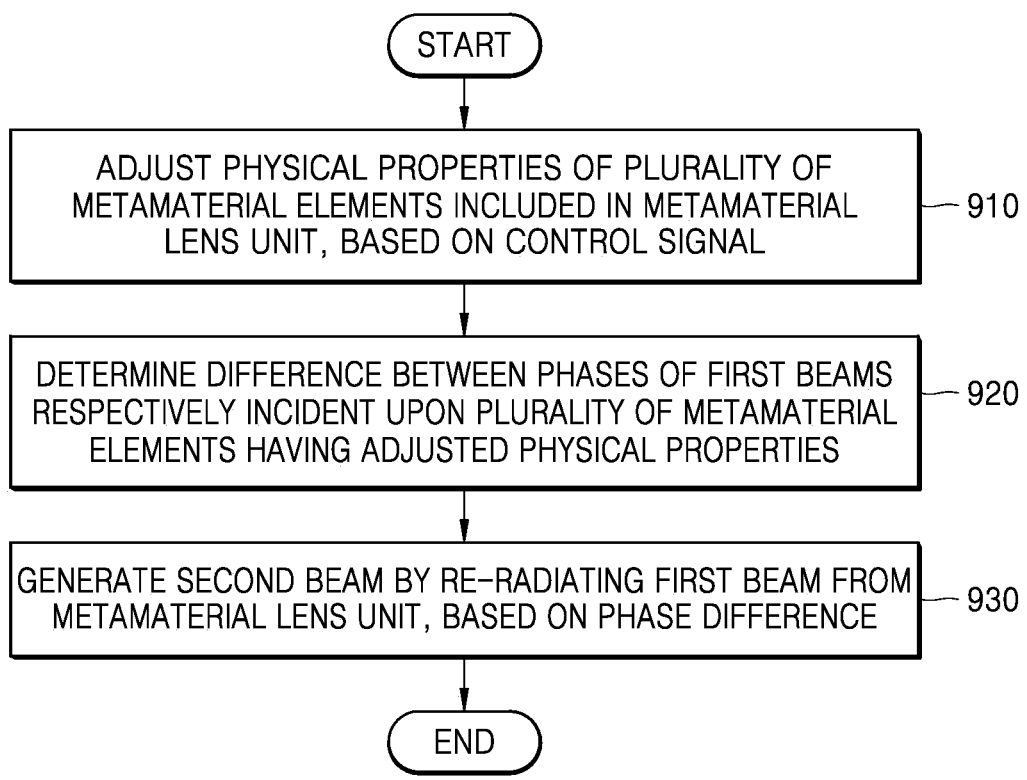
FIG. 9 is a flowchart of a method of generating a beam by using a metamaterial lens, according to an embodiment of the disclosure.

FIG. 9 is a flowchart of a method of generating a beam by using a metamaterial lens, according to an embodiment of the disclosure.

Referring to FIG. 9, in operation 910, the base station may adjust the physical properties of a plurality of metamaterial elements included in the metamaterial lens unit, based on the control signal. According to an embodiment, the control signal may be generated based on the physical properties of the first beam generated via hybrid beamforming. According to an embodiment, the control signal may be generated by the metamaterial lens controller. The base station may adjust the physical properties of the plurality of metamaterial elements included in the metamaterial lens unit, by applying the control signal generated by the metamaterial lens controller to the metamaterial lens unit. The physical properties of the plurality of metamaterial elements may include permittivity, permeability, or the like of the metamaterial elements. According to an embodiment, each metamaterial element included in the metamaterial lens unit may refer to a unit cell capable of refracting or reflecting an incident wave by adjusting the phase and amplitude of the incident wave.

In operation 920, the base station may determine a difference between phases of first beams respectively incident upon the plurality of metamaterial elements having adjusted physical properties. For example, when the first beam is incident upon the metamaterial lens unit of which the physical properties have been adjusted by the control signal in operation 910, a phase difference of a wave (e.g., the first beam) may be generated for each of the plurality of metamaterial elements included in the metamaterial lens unit. The base station may calculate the phase difference of the wave generated in the plurality of metamaterial elements. According to an embodiment, beams having different phases for the metamaterial elements may be radiated in different directions.

In operation 930, the base station may generate the second beam by re-radiating the first beam from the metamaterial lens unit, based on the phase difference. In other words, the base station may generate a phase difference for the first beam incident upon the metamaterial lens unit, and may generate the second beam by using the phase difference. For example, the base station may generate a beam traveling in a specific direction, by summing the beams having phase differences respectively generated for the plurality of metamaterial elements included in the metamaterial lens unit. The beam traveling in the specific direction may refer to the second beam. Embodiments of transmitting DL signals by using the first beam generated via hybrid beamforming and the second beam generated by re-radiating the first beam from the metamaterial lens unit will be described below with reference to FIGS. 10 through 12.

According to an embodiment, the operation of the base station described above with reference to FIG. 9 may also be performed by a terminal. For example, the terminal may generate the second beam by radiating the first beam from the metamaterial lens unit via operations 910 through 930.

According to an embodiment, the first beam may be generated via hybrid beamforming by the antenna unit 720 of FIG. 7, and the second beam may be generated by the metamaterial unit 710 of FIG. 7. In this case, the first beam generated via hybrid beamforming may include at least one beam group. The second beam generated from the first beam may include a plurality of beams corresponding to each of the at least one beam group included in the first beam.

For example, the first beam may include a first beam group, a second beam group, and a third beam group. The beams included in the first beam group may be re-radiated through the metamaterial lens. Due to the re-radiation of the beams included in the first beam group via the metamaterial lens, a plurality of beams corresponding to the first group may be formed. Similar to the method of forming the plurality of beams corresponding to the first beam group, a plurality of beams corresponding to the second beam group and a plurality of beams corresponding to the third beam group may be formed.

Figure 10:
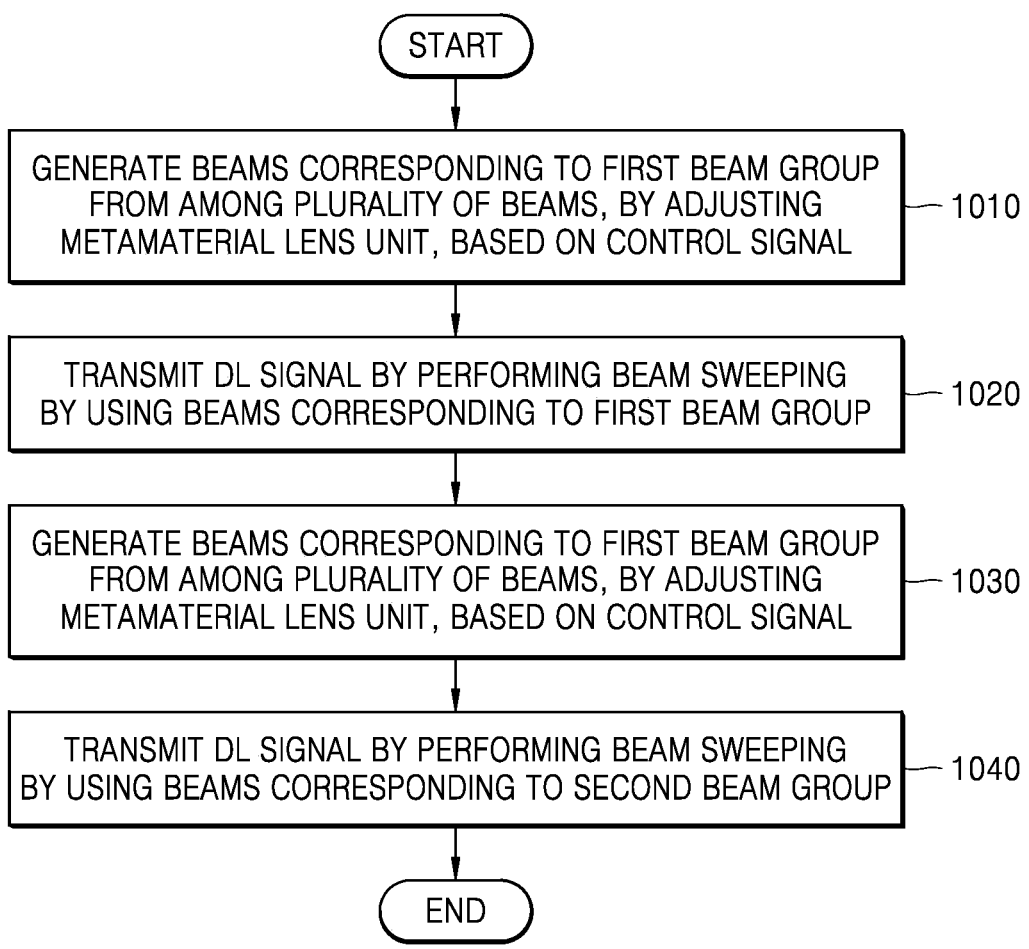
FIG. 10 is a flowchart of a method of transmitting a DL signal, according to an embodiment of the disclosure.

FIG. 10 is a flowchart of a method of transmitting a DL signal, according to an embodiment of the disclosure.

Referring to FIG. 10, in operation 1010, the base station may generate beams corresponding to a first beam group from among a plurality of beams, by adjusting the metamaterial lens unit, based on the control signal. For example, the base station may generate the first beam via hybrid beamforming, and the first beam may include beam groups. According to an embodiment, the base station may radiate a first beam group from among the beam groups included in the first beam to the metamaterial lens unit. The base station may generate beams corresponding to the radiated first group, by adjusting the metamaterial lens unit, based on the control signal.

In operation 1020, the base station may transmit the DL signal by performing beam sweeping by using the beams corresponding to the first beam group. According to an embodiment, the beam sweeping may refer to sequentially radiating, while sweeping, beams having different directions included in a specific range in which the base station or the terminal may form a beam. For example, within a range in which the base station or the terminal may form a beam, when beams A, B, and C may be sequentially formed according to angle sizes from a horizontal plane, the base station or the terminal may radiate the beams A, B, and C while sequentially sweeping the beams A, B, and C. Accordingly, the base station may transmit a DL signal such as an SSB or a CSI-RS, by sweeping a plurality of beams corresponding to the first beam group.

In operation 1030, the base station may generate beams corresponding to a first beam group from among the plurality of beams, by adjusting the metamaterial lens unit, based on the control signal. For example, the base station may generate the first beam via hybrid beamforming, and the first beam may include beam groups. According to an embodiment, the base station may radiate the second beam group from among the beam groups included in the first beam to the metamaterial lens unit. The base station may generate beams corresponding to the radiated second beam group, by adjusting the metamaterial lens unit by using the control signal.

In operation 1040, the base station may transmit the DL signal by performing beam sweeping by using the beams corresponding to the second beam group. The base station may perform beam sweeping as described above with reference to operation 1020. For example, the base station may transmit a DL signal such as an SSB or a CSI-RS, by sweeping the beams corresponding to the second beam group.

In the method described above with reference to FIG. 10, when the base station sweeps the beams corresponding to the first beam group, the base station may apply the control signal to the metamaterial lens unit in order to change the directions of the beams corresponding to the first beam group. Also, when the base station sweeps the beams corresponding to the second beam group, the base station may apply the control signal to the metamaterial lens unit in order to change the directions of the beams corresponding to the second beam group.

According to an embodiment, when the base station performs beam sweeping by applying the control signal to the metamaterial lens unit, a saturation time may be generated between sections where beams in different directions are generated. For example, a predetermined time period after a first beam for transmitting SSB 1 is generated and before a second beam for transmitting SSB 2 is generated may lapse. The predetermined time period may refer to a time period taken for the base station to change the direction of a beam that may be radiated by the metamaterial lens unit, by adjusting the metamaterial lens unit by using a metamaterial control signal. The predetermined time period may vary according to the physical properties of the metamaterial lens, and the terminal and the base station may be previously aware of the predetermined time period.

According to an embodiment, the operation of the base station described above with reference to FIG. 10 may be performed by the terminal. However, unlike the base station, the terminal may transmit an UL signal to the base station by using the generated beams without transmitting the DL signals.

Figure 11:
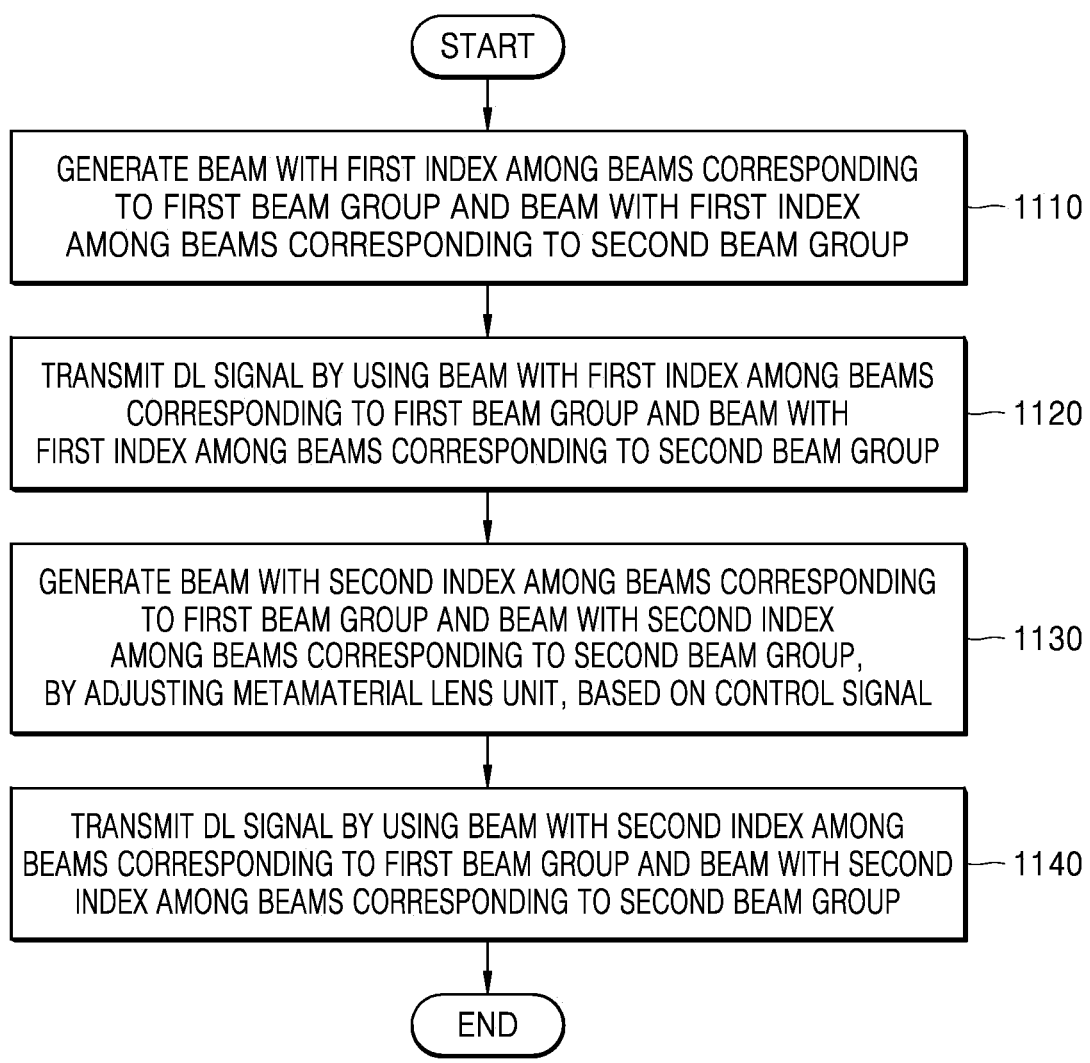
FIG. 11 is a flowchart of a method of transmitting a DL signal, according to another embodiment of the disclosure.

FIG. 11 is a flowchart of a method of transmitting a DL signal, according to another embodiment of the disclosure.

Referring to FIG. 11, in operation 1110, the base station may generate a beam with a first index among the beams corresponding to the first beam group and a beam with a first index among the beams corresponding to the second beam group. For example, the base station may radiate to the metamaterial lens unit the first and second beam groups from among the beam groups included in the first beam generated via hybrid beamforming. The base station may generate the beams corresponding to the radiated first and second groups, by adjusting the metamaterial lens unit by using the control signal. According to an embodiment, the base station may generate a beam with a first index among the beams corresponding to the first beam group and a beam with a first index among the beams corresponding to the second beam group. For example, the base station may generate a first beam among the beams corresponding to the first beam group as the beam with the first index. The base station may generate a first beam among the beams corresponding to the second beam group as the beam with the first index.

In operation 1120, the base station may transmit the DL signal by using the beam with the first index among the beams corresponding to the first beam group and the beam with the first index among the beams corresponding to the second beam group. For example, the base station may transmit a DL signal, such as an SSB or a CSI-RS, to the terminal by using the first beam among the beams corresponding to the first beam group and the first beam among the beams corresponding to the second beam group.

In operation 1130, the base station may generate a beam with a second index among the beams corresponding to the first beam group and a beam with a second index among the beams corresponding to the second beam group, by adjusting the metamaterial lens unit, based on the control signal. In other words, the base station may generate the beam with the second index among the beams corresponding to the first beam group and the beam with the second index among the beams corresponding to the second beam group, by applying the control signal generated by the metamaterial lens controller to the metamaterial lens unit. For example, the base station may generate a second beam among the beams corresponding to the first beam group as the beam with the second index. The base station may generate a second beam among the beams corresponding to the second beam group as the beam with the second index. According to an embodiment, the beam with the second index described above with reference to operation 1130 may refer to a next beam having a different direction from the beam with the first index described above with reference to operation 1110.

In operation 1140, the base station may transmit the DL signal by using the beam with the second index among the beams corresponding to the first beam group and the beam with the second index among the beams corresponding to the second beam group. For example, the base station may transmit a DL signal, such as an SSB or a CSI-RS, to the terminal by using the beam with the second index among the beams corresponding to the first beam group and the beam with the second index among the beams corresponding to the second beam group.

In the method described above with reference to FIG. 11, the base station may apply the control signal to the metamaterial lens unit in order to change a beam direction from the beams with the first index of the first beam group and the second beam group to the beams with the second index of the first beam group and the second beam group. Accordingly, in the method described above with reference to FIG. 11, fewer metamaterial control signals may be generated than in the method described above with reference to FIG. 10.

According to an embodiment, when the base station applies the control signal to change a beam direction from the beams with the first index of the first beam group and the second beam group to the beams with the second index of the first beam group and the second beam group, the beams with the second index may be generated after a predetermined time period after the control signal is transmitted. The predetermined time period may be referred to as a saturation time, and, as described above with reference to FIG. 10, may refer to a time period taken to change the direction of a beam that may be radiated by the metamaterial lens unit.

Although the beam with the first index is the first beam among the plurality of beams and the beam with the second index is the second beam among the plurality of beams in FIG. 11, embodiments are not limited thereto. In other words, the beam with the second index only refers to a beam next to the beam with the first index, and thus the beam with the first index and the beam with the second index are not limited to the first beam and the second beam among the plurality of beams.

According to an embodiment, the operation of the base station described above with reference to FIG. 11 may also be performed by the terminal. However, unlike the base station, the terminal may transmit an UL signal to the base station by using the generated beams without transmitting the DL signals.

Figure 12:
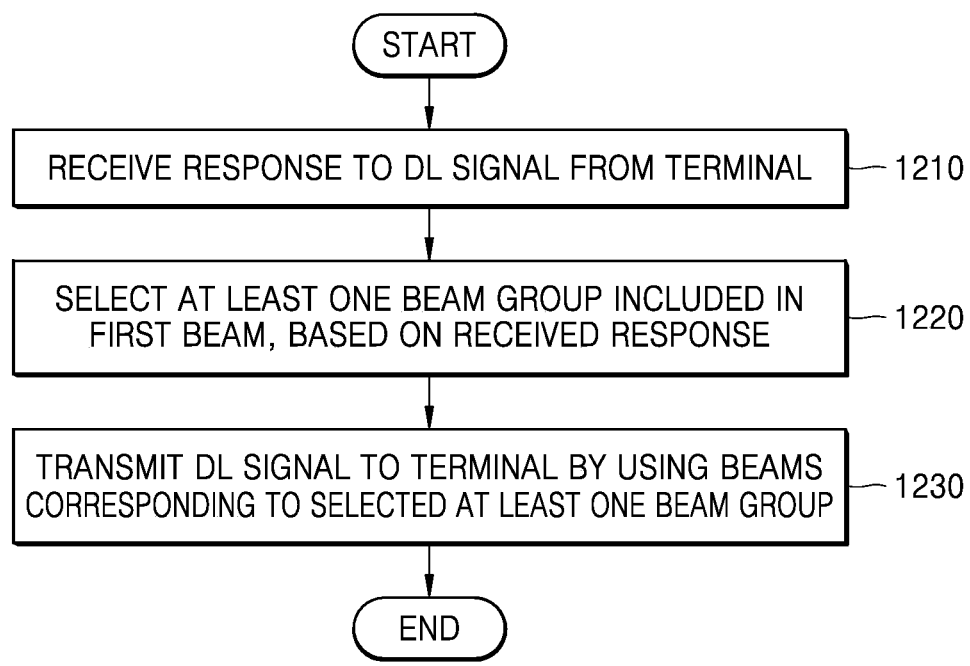
FIG. 12 is a flowchart of a method of transmitting a DL signal, based on a response from a terminal, according to an embodiment of the disclosure.

FIG. 12 is a flowchart of a method of transmitting a DL signal, based on a response from the terminal, according to an embodiment of the disclosure.

Referring to FIG. 12, in operation 1210, the base station may receive a response to the DL signal from the terminal. For example, the base station may generate the second beam via hybrid beamforming and 2-stage beam generation using the metamaterial lens, and may transmit the DL signal to the terminal by using the second beam. The terminal may measure the intensity or the like of the DL signal received from the base station and may report a result of the measurement to the base station. For example, the terminal may perform channel state measurement and may feed CSI back to the base station. According to an embodiment, the CSI feedback of the terminal may be referred to as a CSI report.

In operation 1220, the base station may select at least one beam group included in the first beam, based on a received response. For example, the base station may select a beam having a good channel state, based on a feedback of a channel state received from the terminal. When the value of the channel state measurement is greater than a preset threshold value, the base station may determine the channel state to be good. Information about the preset threshold value may be pre-stored in the base station or the terminal. According to an embodiment, the base station may select some of a plurality of beam groups generated via hybrid beamforming, based on the CSI feedback from the terminal.

In operation 1230, the base station may transmit the DL signal to the terminal by using the beams corresponding to the selected at least one beam group. In other words, the base station may radiate, to the metamaterial lens unit, the at least one beam group selected based on the CSI feedback from the terminal in operation 1220. The base station may re-radiate the beams corresponding to each beam group by using the metamaterial lens unit. The base station may transmit the DL signal to the terminal by using the re-radiated beams.

Figure 13:
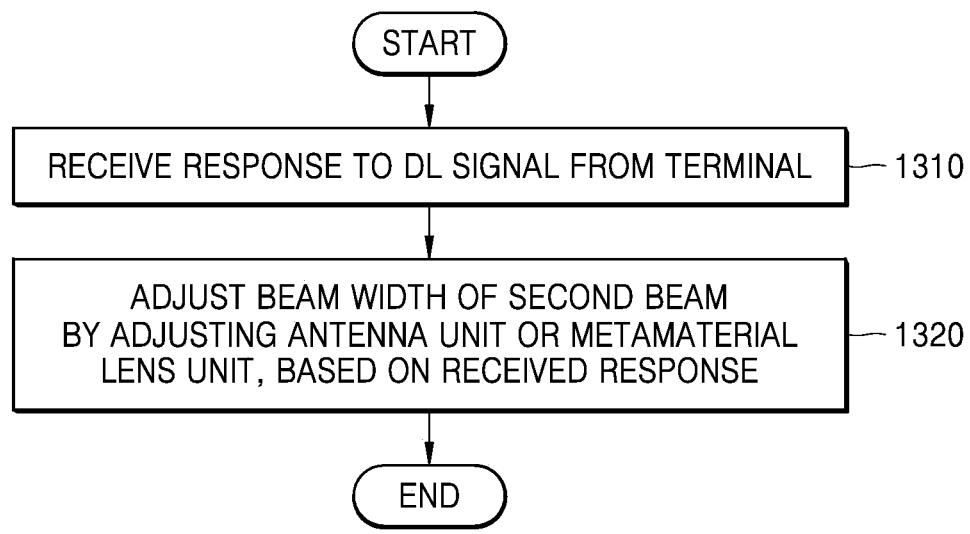
FIG. 13 is a flowchart of a method of adjusting a beam width, based on a response from a terminal, according to an embodiment of the disclosure.

FIG. 13 is a flowchart of a method of adjusting a beam width, based on a response from the terminal, according to an embodiment of the disclosure.

Referring to FIG. 13, in operation 1310, the base station may receive a response to the DL signal from the terminal. According to an embodiment, the response to the DL signal received from the terminal may refer to the channel state report by the terminal described above with reference to FIG. 12. The base station may transmit the DL signal to the terminal by using the beam generated via the metamaterial lens unit, and then may receive the channel state report from the terminal.

In operation 1320, the base station may adjust a beam width of the second beam by adjusting the antenna unit or the metamaterial lens unit, based on a received response. For example, the base station may determine the range of a beam having a good channel state, based on the channel state report by the terminal. The base station may generate the control signal for controlling the metamaterial lens unit, based on the determined range of the beam. The base station may adjust the width of the beam generated via the metamaterial lens unit to the range of the beam having a good channel state, by applying the generated control signal to the metamaterial lens unit.

Embodiments of executions of the methods described above with reference to FIGS. 8 through 13 will now be described with reference to FIGS. 14 through 24.

Figure 14:
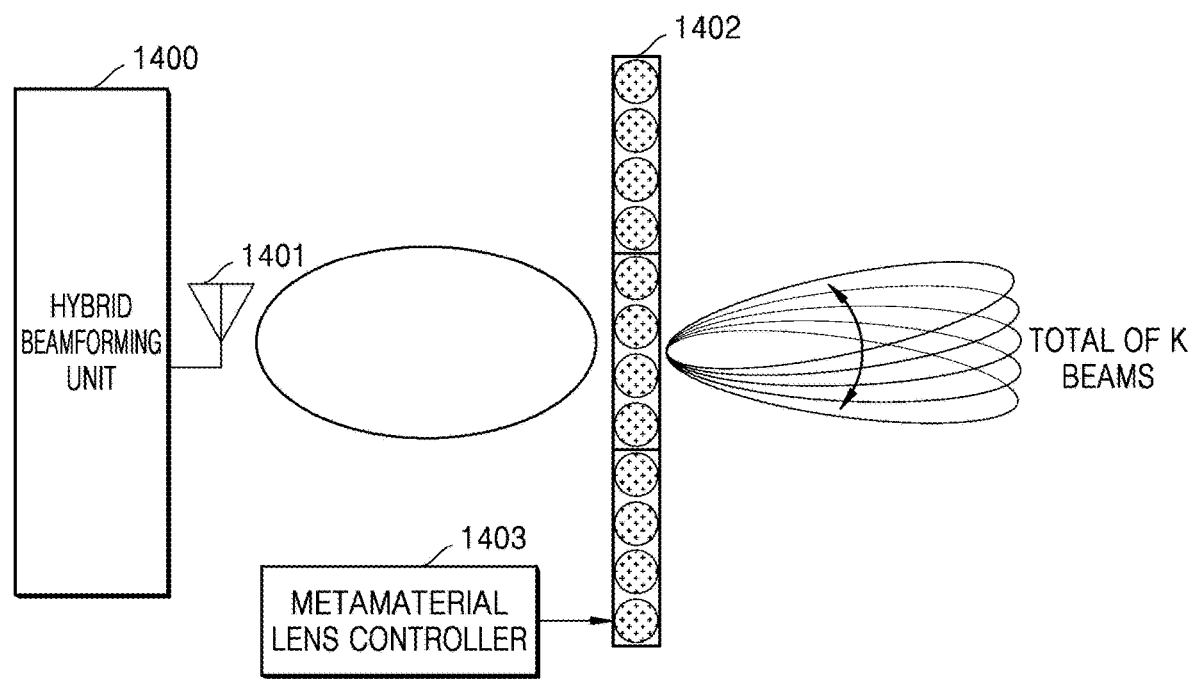
FIG. 14 illustrates a 2-stage antenna structure for adjusting a beam by using a single antenna and a metamaterial lens, according to an embodiment of the disclosure.

FIG. 14 illustrates a 2-stage antenna structure for adjusting a beam by using a single antenna and a metamaterial lens, according to an embodiment of the disclosure. FIG. 14 may correspond to the method described above with reference to FIG. 8.

Referring to FIG. 14, the transceiver of the terminal or the base station may include the metamaterial unit and the antenna unit. The antenna unit may include a hybrid beamforming unit 1400 and an antenna 1401, and the metamaterial unit may include a metamaterial lens 1402 and a metamaterial lens controller 1403. The embodiment of FIG. 14 illustrates a case where the antenna 1401 includes a single antenna.

According to an embodiment, the hybrid beamforming unit 1400 may perform hybrid beamforming corresponding to a combination of analog beamforming and digital beamforming, and beams generated via the hybrid beamforming may be radiated (or oriented or transmitted) to the metamaterial lens 1402 via the antenna 1401. According to an embodiment, because the antenna 1401 includes a single antenna, a beam radiated by the antenna 1401 may have a single pattern.

According to an embodiment, the metamaterial lens controller 1403 may change the beam direction and the beam width of the beam radiated to the metamaterial lens 1402, by adjusting the metamaterial lens 1402. In other words, the metamaterial lens controller 1403 may control the transfer path of a wave radiated to the metamaterial lens 1402. The beam intensity and the beam width of the transmitted or received wave may be adjusted via the metamaterial lens 1402. Accordingly, in the example of FIG. 14, one beam group is radiated by the antenna 1401, but a total of K beams are re-radiated via the metamaterial lens 1402. An example of DL signal transmission related to FIG. 14 will now be described with reference to FIG. 15.

Figure 15:
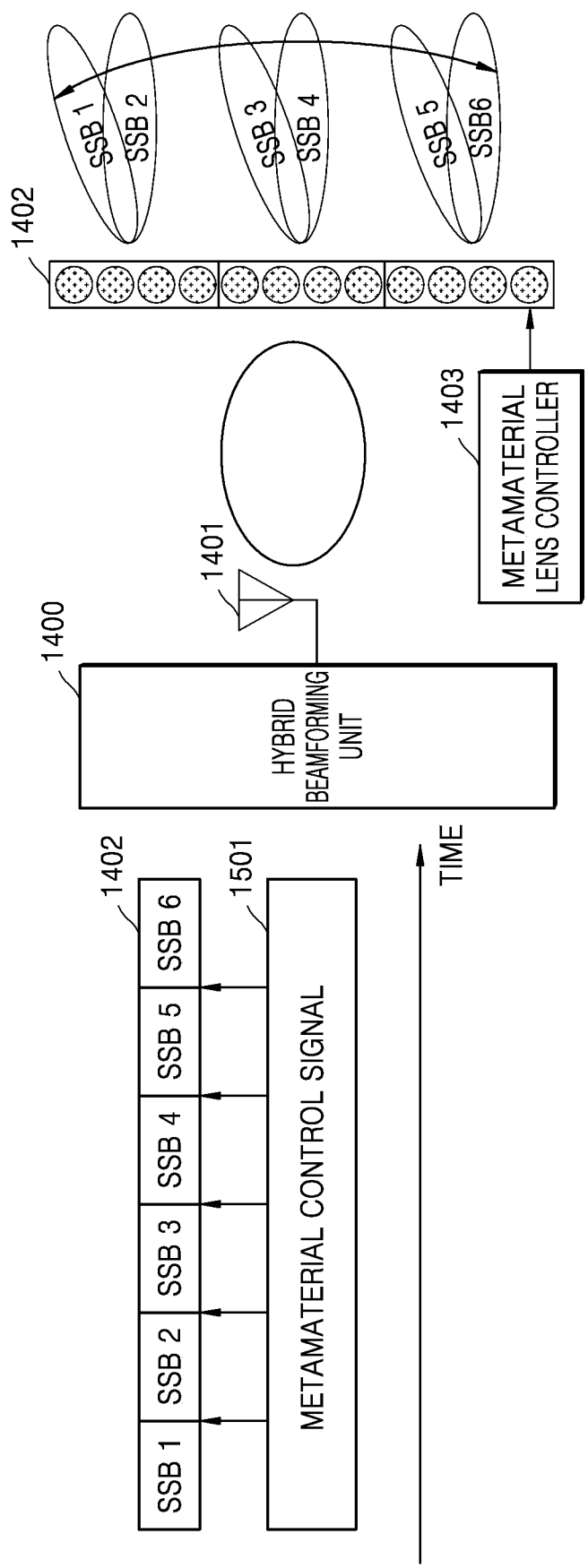
FIG. 15 illustrates a method, performed by a base station including a single antenna, of transmitting a DL signal, according to an embodiment of the disclosure.

FIG. 15 illustrates a method, performed by a base station including a single antenna, of transmitting a DL signal, according to an embodiment of the disclosure.

Referring to FIG. 15, a metamaterial control signal 1501 may be applied to the metamaterial lens 1402. Due to the application of the metamaterial control signal 1501, signals SSB 1, SSB 2, SSB 3, SSB 4, SSB 5, and SSB 6 having different directions may generated in the metamaterial lens 1402. In FIG. 15, the signals SSB 1, SSB 2, SSB 3, SSB 4, SSB 5, and SSB 6 may be generated in chronological order, and the horizontal axis representing SSB 1, SSB 2, SSB 3, SSB 4, SSB 5 and SSB 6 may refer to the time. Accordingly, the base station may transmit the generated SSBs to the terminal. In an antenna structure including no metamaterial lenses, it is impossible to transmit a plurality of SSBs by using a single antenna. However, when the metamaterial lens 1402 and the metamaterial lens controller 1403 according to the disclosure are used, the base station may generate a plurality of SSBs.

According to an embodiment, the plurality of SSBs may have different beam intensities, different beam widths, and different beam directions, and may be transmitted to the terminal via a transmission channel. To generate different beams (or signals), the metamaterial lens controller 1403 may generate a control signal at time intervals of the size of an SSB or greater, and may adjust the metamaterial lens 1402 by using the generated control signals. For example, the base station may generate the signals SSB 1, SSB 2, SSB 3, SSB 4, SSB 5, and SSB 6 having different beam directions by adjusting the metamaterial lens 1402.

According to an embodiment, when the base station transmits an SSB to the terminal, the base station may implicitly inform the terminal of a timing when the SSB is transmitted, or may explicitly include information about the index of the SSB in the SSB and transmit the SSB including the information to the terminal. For example, information about SSB transmission timing and SSB receiving timing may be previously set in the base station and the terminal. Accordingly, when the terminal receives an SSB at a certain timing, the terminal may ascertain a sequential order of the SSB.

According to an embodiment, when the base station transmits SSBs to the terminal by using the metamaterial lens 1402, the terminal may measure respective channel states for the received SSBs, and may transmit, to the base station, information of the measured channel states together with the information about the timings when the SSBs are respectively received. The base station may determine an SSB having a good channel state from among the SSBs transmitted to the terminal, based on the information about the timings when the SSBs are respectively received and the information of the measured channel states.

Figure 16:
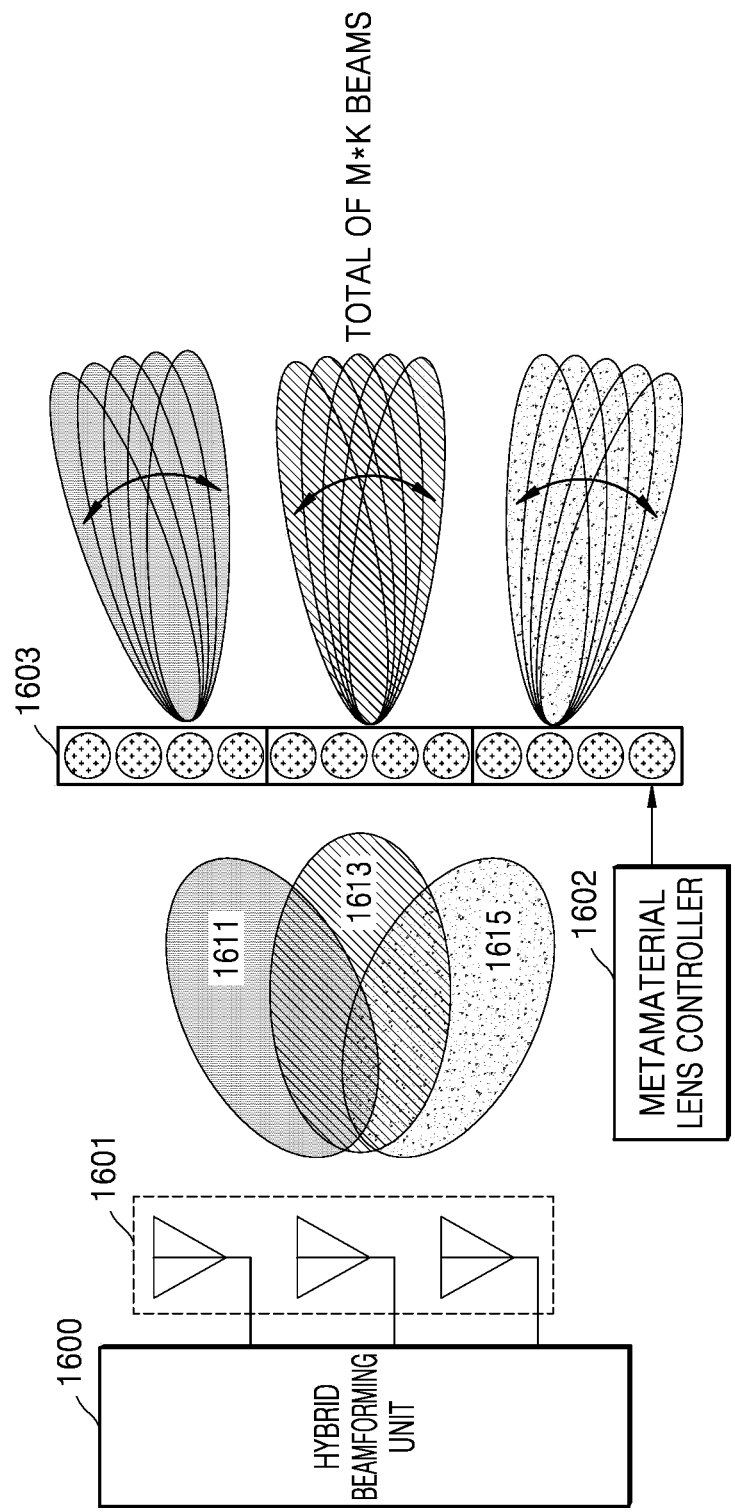
FIG. 16 illustrates a 2-stage antenna structure for adjusting a beam by using a plurality of antennas and a metamaterial lens, according to an embodiment of the disclosure.

FIG. 16 illustrates a 2-stage antenna structure for adjusting a beam by using a plurality of antennas and a metamaterial lens, according to an embodiment of the disclosure. FIG. 16 may correspond to the method described above with reference to FIG. 8.

Referring to FIG. 16, the transceiver of the terminal or the base station may include the metamaterial unit and the antenna unit. The antenna unit may include a hybrid beamforming unit 1600 and a plurality of antennas 1601, and the metamaterial unit may include a metamaterial lens controller 1602 and a metamaterial lens 1603. First-stage beam adjustment that is performed by the hybrid beamforming unit 1600 may be performed via hybrid beamforming that is an independent or dependent combination of analog beamforming and digital beamforming. The metamaterial lens 1603 upon which a first-stage beam generated via the first-stage beam adjustment is incident may generate a second-stage beam in consideration of the beam direction, beam width, and the like of the incident first-stage beam, by receiving a control signal generated by the metamaterial lens controller 1602.

For example, a beam may be adjusted via the plurality of antennas 1601 and thus a total of M beam groups may be generated. For example, in FIG. 16, the M beam groups may include a first beam group 1611, a second beam group 1613, and a third beam group 1615. The metamaterial lens controller 1602 may adjust the beam incident upon the metamaterial lens 1603 by applying the control signal to the metamaterial lens 1603. K beams may be generated via the beam adjustment of the metamaterial lens 1603. Accordingly, a total of M*K different beams may be generated.

When second-stage beam adjustment using the metamaterial lens 1603 is performed as in FIG. 16, the number of antennas 1601 radiating the first-stage beam may be reduced, compared with a system that performs existing beam adjustment. The number of RF chains radiating a beam through an antenna may be reduced, and thus power consumption for driving the RF chains may be reduced. Due to the reduction of the number of antennas, a distance between antennas arranged in a limited space may be increased, and thus coupling interference due to a current between antennas may be reduced.

Figure 17:
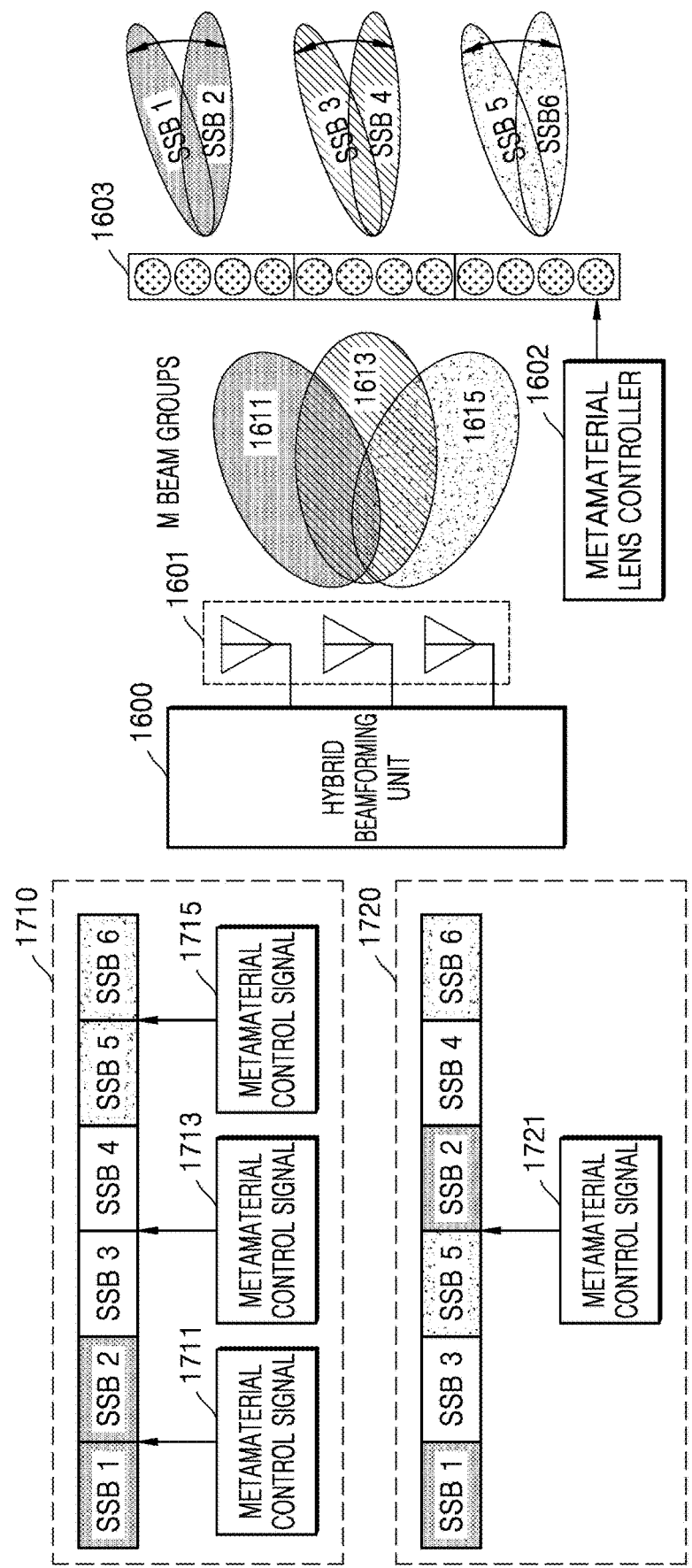
FIG. 17 illustrates a method, performed by a base station including a plurality of antennas, of transmitting a DL signal, according to an embodiment of the disclosure.

FIG. 17 illustrates a method, performed by a base station including a plurality of antennas, of transmitting a DL signal, according to an embodiment of the disclosure. An example of DL signal transmission related to FIG. 16 will now be described with reference to FIG. 17. Hereinafter, metasurface beamforming may refer to a beamforming technique of generating a beam by using a metasurface lens.

Referring to FIG. 17, when the base station transmits the DL signal such as an SSB to the terminal, the base station may control hybrid beamforming and also a metamaterial lens, and thus the order in which the base station transmits the DL signal to the terminal may be divided into two schemes. For example, FIG. 17 illustrates a first scheme 1710 and a second scheme 1720.

According to an embodiment, the first scheme 1710 may refer to a scheme in which beam sweeping according to metasurface beamforming is first performed. For example, the base station may generate beams by adjusting the metamaterial lens 1603 by using the metamaterial lens controller, and may transmit DL signals by using the generated beams. After transmitting the generated DL signals, the base station may generate beams corresponding to a next beam group by using hybrid beamforming. The base station may transmit DL signals by using the generated beams. For example, in the first scheme 1710 of FIG. 17, the base station may generate and transmit SSB 1 corresponding to the first beam group 1611, and may generate and transmit SSB 2 corresponding to the first beam group 1611 by applying a metamaterial control signal 1711 to the metamaterial lens 1603. The base station may switch from the first beam group 1611 to the second beam group 1613 via hybrid beamforming. The base station may generate and transmit SSB 3 corresponding to the second beam group 1613, and may generate and transmit SSB 4 corresponding to the second beam group 1613 by applying a metamaterial control signal 1713 to the metamaterial lens 1603. The base station may switch from the second beam group 1613 to the third beam group 1615 via hybrid beamforming. The base station may generate and transmit SSB 5 corresponding to the third beam group 1615, and may generate and transmit SSB 6 corresponding to the third beam group 1615 by applying a metamaterial control signal 1715 to the metamaterial lens 1603.

According to an embodiment, the second scheme 1720 may refer to a scheme in which beam sweeping according to hybrid beamforming is first performed. For example, the base station may generate and transmit a DL signal by using a beam with a first index among the beams corresponding to each beam group by using hybrid beamforming. The base station may generate and transmit a DL signal by using a beam with a second index among the beams corresponding to each beam group, by adjusting the metamaterial lens 1603 by using the metamaterial lens controller 1602.

For example, in the second scheme 1720 of FIG. 17, the base station may generate and transmit SSB 1 corresponding to the first beam group 1611, SSB 3 corresponding to the second beam group 1613, and SSB 5 corresponding to the third beam group 1615 via hybrid beamforming. The base station may generate and transmit SSB 2 corresponding to the first beam group 1611, SSB 4 corresponding to the second beam group 1613, and SSB 6 corresponding to the third beam group 1615 by applying a metamaterial control signal 1721 to the metamaterial lens 1603. In the above-described example, SSB 1 corresponding to the first beam group 1611, SSB 3 corresponding to the second beam group 1613, and SSB 5 corresponding to the third beam group 1615 may refer to beams with the first index of the first, second, and third beam groups 1611, 1613, and 1615, respectively. SSB 2 corresponding to the first beam group 1611, SSB 4 corresponding to the second beam group 1613, and SSB 6 corresponding to the third beam group 1615 may refer to beams with the second index of the first, second, and third beam groups 1611, 1613, and 1615, respectively.

When the second scheme 1720 is used, the number of metamaterial control signals for adjusting a beam may be reduced, compared with when the first scheme 1710 is used. Accordingly, overhead for controlling the metamaterial lens 1603 may be reduced.

Figure 18:
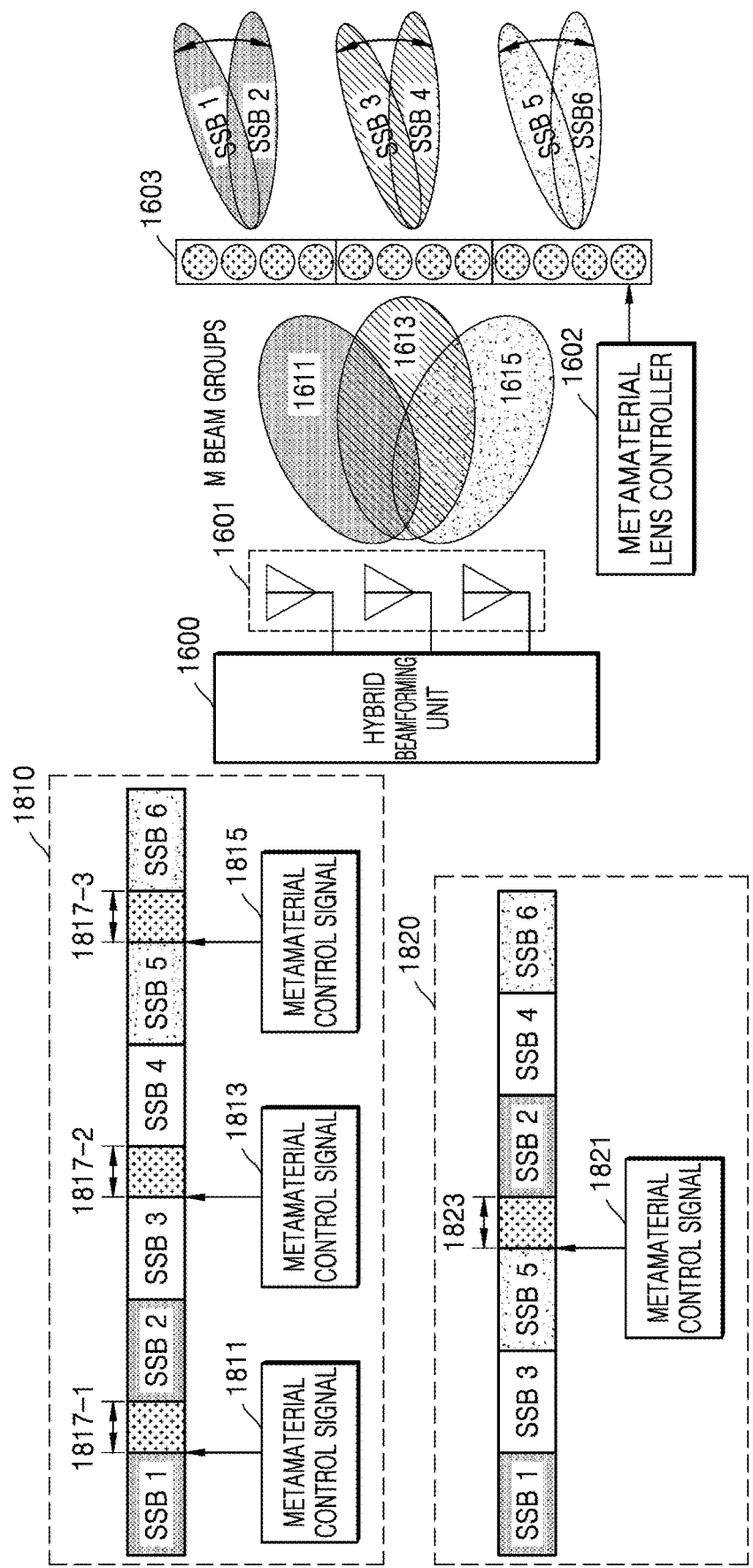
FIG. 18 illustrates a method of transmitting a DL signal in consideration of a metasurface adaptation time, according to an embodiment of the disclosure.

FIG. 18 illustrates a method of transmitting a DL signal in consideration of a metasurface adaptation time, according to an embodiment of the disclosure.

Referring to FIG. 18, the metasurface adaptation time may refer to a specific time period during which a control signal for controlling a metamaterial lens is generated and transmitted to the metamaterial lens and the metamaterial lens searches for a new beam direction via the control signal. This metasurface adaptation time may be referred to as a saturation time, and the terminal and the base station may be previously aware of information about the metasurface adaptation time.

The example of FIG. 18 is different from that of FIG. 17 in that, when different beams are generated and transmitted via the metamaterial lens, the above-described metasurface adaptation time may be generated. In a metamaterial lens structure that needs the above-described metasurface adaptation time, when a DL signal is transmitted, the number of DL signals that may be transmitted during a unit time may vary according to a scheme (e.g., a first scheme) in which beam sweeping according to metasurface beamforming is first performed, and a scheme (e.g., a second scheme) in which beam sweeping according to hybrid beamforming is first performed. For example, in a system for controlling a liquid crystal metamaterial lens via a direct current (DC) voltage, various time periods from several microseconds (μs) to several milliseconds (ms) may be generated until a new beam is generated. In this case, in the scheme (e.g., the second scheme) in which beam sweeping according to hybrid beamforming is first performed, a beam may be swept more quickly than in the scheme (e.g., the first scheme) in which beam sweeping according to metasurface beamforming is first performed. Because the number of control signals used to control the metamaterial lens is less in the second scheme than in the first scheme, overhead according to the control signal may be reduced. Accordingly, more efficient DL signal generation and transmission or reception may be performed.

The example of FIG. 18 will now be described in detail. FIG. 18 illustrates examples according to a first scheme 1810 in which beam sweeping according to metasurface beamforming is first performed and a second scheme 1820 in which beam sweeping according to hybrid beamforming is first performed.

According to an embodiment, in the first scheme 1810, the base station may generate a new beam after a metasurface adaptation time by adjusting the metamaterial lens 1603 by using the metamaterial lens controller 1602, and may transmit DL signals by using the generated beam. The base station may generate beams corresponding to a next beam group by using hybrid beamforming. The base station may perform beam sweeping in consideration of the metasurface adaptation time by adjusting the metamaterial lens 1603 for the beams corresponding to the next beam group.

For example, in the first scheme 1810 of FIG. 18, the base station may generate and transmit SSB 1 corresponding to the first beam group 1611, and may apply a metamaterial control signal 1811 to the metamaterial lens 1603. After a first metasurface adaptation time 1817-1, SSB 2 corresponding to the first beam group 1611 may be generated. The base station may transmit the generated SSB 2 to the terminal. The base station may switch from the first beam group 1611 to the second beam group 1613 via hybrid beamforming. The base station may generate and transmit SSB 3 corresponding to the second beam group 1613, and may apply a metamaterial control signal 1813 to the metamaterial lens 1603. After a second metasurface adaptation time 1817-2, SSB 4 corresponding to the second beam group 1613 may be generated. The base station may transmit the generated SSB 4 to the terminal. The base station may switch from the second beam group 1613 to the third beam group 1615 via hybrid beamforming. The base station may generate and transmit SSB 5 corresponding to the third beam group 1615, and may apply a metamaterial control signal 1815 to the metamaterial lens 1603. After a third metasurface adaptation time 1817-3, SSB 6 corresponding to the third beam group 1615 may be generated. The base station may transmit the generated SSB 6 to the terminal.

According to an embodiment, the second scheme 1820 of FIG. 18 may refer to a scheme in which beam sweeping according to hybrid beamforming is first performed. For example, the base station may generate and transmit a DL signal by using a beam with a first index among the beams corresponding to each beam group by using hybrid beamforming. The base station may generate and transmit a DL signal by using a beam with a second index among the beams corresponding to each beam group, by adjusting the metamaterial lens 1603 by using the metamaterial lens controller 1602.

For example, in the second scheme 1820 of FIG. 18, the base station may generate and transmit SSB 1 corresponding to the first beam group 1611, SSB 3 corresponding to the second beam group 1613, and SSB 5 corresponding to the third beam group 1615 via hybrid beamforming. The base station may apply a metamaterial control signal 1821 to the metamaterial lens 1603. After a metasurface adaptation time 1823, SSB 2 corresponding to the first beam group 1611, SSB 4 corresponding to the second beam group 1613, and SSB 6 corresponding to the third beam group 1615 may be generated. In the above-described example, SSB 1 corresponding to the first beam group 1611, SSB 3 corresponding to the second beam group 1613, and SSB 5 corresponding to the third beam group 1615 may refer to beams with the first index of the first, second, and third beam groups 1611, 1613, and 1615, respectively. SSB 2 corresponding to the first beam group 1611, SSB 4 corresponding to the second beam group 1613, and SSB 6 corresponding to the third beam group 1615 may refer to beams with the second index of the first, second, and third beam groups 1611, 1613, and 1615, respectively.

When the second scheme 1820 is used, the number of metamaterial control signals for adjusting a beam may be reduced, compared with when the first scheme 1810 is used, and accordingly overhead for controlling the metamaterial lens 1603 may be reduced. When the second scheme 1820 is used, the metasurface adaptation time may be less consumed, and thus many DL signals may be transmitted during a limited time period, compared with when the first scheme 1810 is used.

According to an embodiment, the terminal and the base station may be previously aware of information about the metasurface adaptation time described above with reference to FIG. 18. The terminal may be synchronized with SSB reception from the base station by decoding an SSB after a corresponding section, based on a preset metasurface adaptation time.

Methods of setting an order of transmitting a DL signal, such as a synchronization signal (e.g., an SSB) or a CSI-RS, by using a metamaterial lens structure will now be described in detail with reference to FIGS. 19 through 22.

Figure 19:
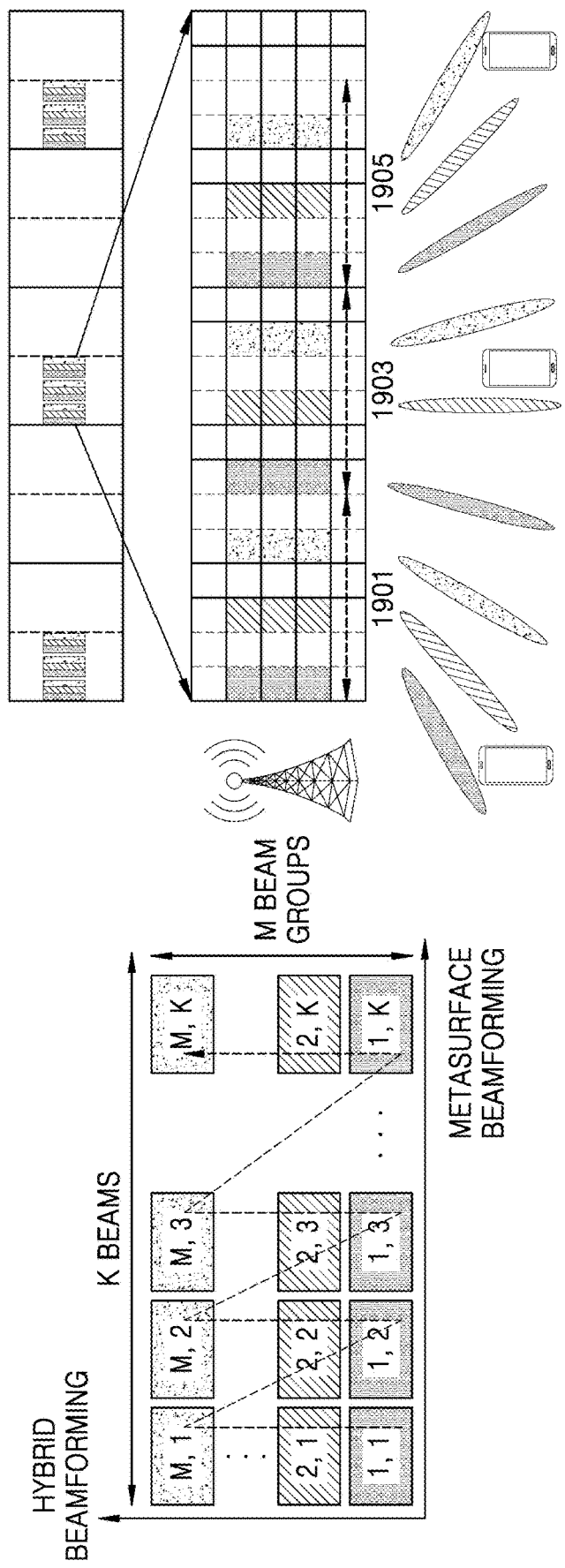
FIG. 19 illustrates a method of setting a DL signal transmission order from hybrid beamforming to metasurface beamforming, according to an embodiment of the disclosure.

FIG. 19 illustrates a method of setting a DL signal transmission order from hybrid beamforming to metasurface beamforming, according to an embodiment of the disclosure.

FIG. 19 illustrates the scheme (e.g., the second scheme) described above with reference to FIG. 17 in which hybrid beamforming is first performed. In FIG. 19, the horizontal axis represents a beam (e.g., SSB) changing scheme via metasurface beamforming, and the vertical axis represents a beam (e.g., SSB) changing scheme via hybrid beamforming. In (x, y) in the graph of FIG. 19, x may refer to the index of a beam group that may be generated via hybrid beamforming, and y may refer to the index of beams that may be generated via metasurface beamforming. A plurality of beams that may be generated via metasurface beamforming may exist for each beam group that may be generated via hybrid beamforming. For example, (1,1), (1,2), (1,3) through to (1,K) beams may exist for a first beam group.

FIG. 19 illustrates an example where K beams are set via metasurface beamforming and M beam groups are set via hybrid beamforming to generate a total of K*M DL signals (e.g., SSB). For example, as indicated by a dashed line in FIG. 19, the base station may fix metasurface beamforming and may generate and transmit a DL signal while first changing a beam group via hybrid beamforming. When the generation and transmission of the DL signal is concluded for all of the beam groups that may be generated via hybrid beamforming, the base station may perform metasurface beamforming and generate and transmit a DL signal while changing a beam group via hybrid beamforming, for the beams with a next index. Generation and transmission of a DL signal in the time-frequency resource domain according to the embodiment of FIG. 19 will now be described in detail.

For example, during a first time period 1901 in the time-frequency resource domain, beams with a first index (e.g., (1,1), (2,1), through to (M,1)) according to metasurface beamforming may be generated and transmitted to correspond to each group that is generated via hybrid beamforming. During a second time period 1903 in the time-frequency resource domain, beams with a second index (e.g., (1,2), (2,2), through to (M,2)) according to metasurface beamforming may be generated and transmitted to correspond to each group that is generated via hybrid beamforming. During a third time period 1905 in the time-frequency resource domain, beams with a third index (e.g., (1,3), (2,3), through to (M,3)) according to metasurface beamforming may be generated and transmitted to correspond to each group that is generated via hybrid beamforming.

Figure 20:
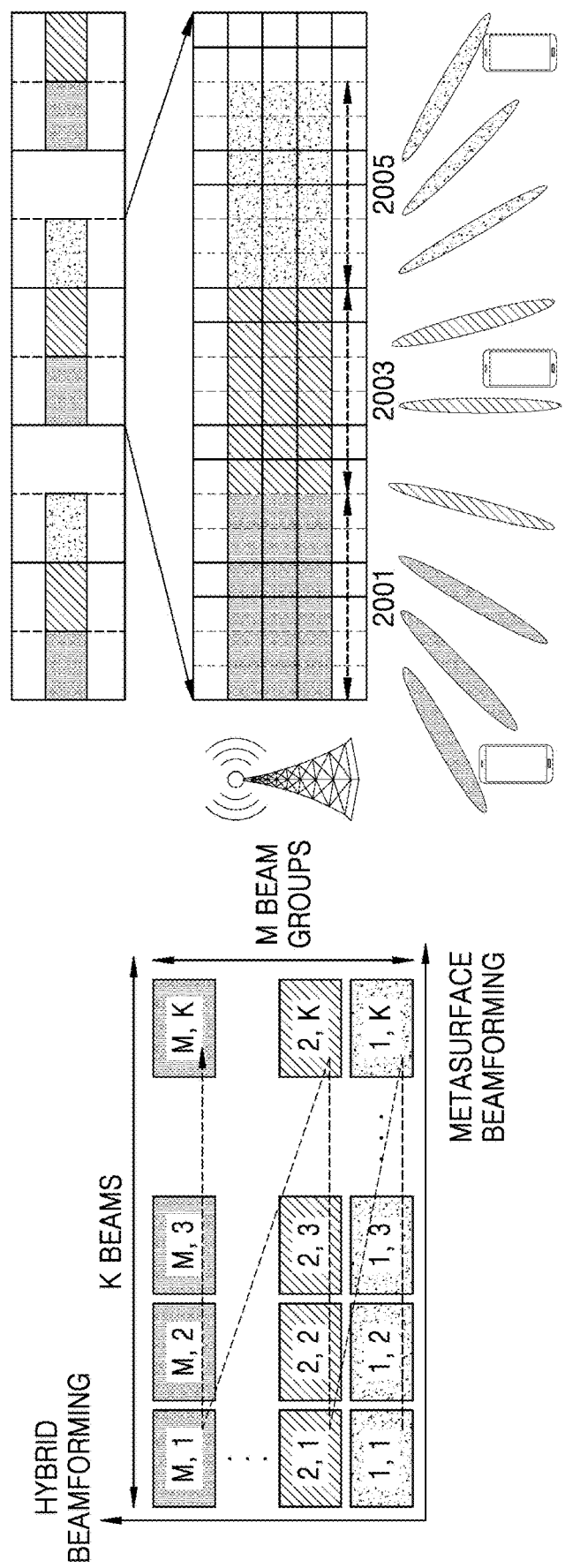
FIG. 20 illustrates a method of setting a DL signal transmission order from metasurface beamforming to hybrid beamforming, according to an embodiment of the disclosure.

FIG. 20 illustrates a method of setting a DL signal transmission order from metasurface beamforming to hybrid beamforming, according to an embodiment of the disclosure.

FIG. 20 illustrates the scheme (e.g., the first scheme) described above with reference to FIG. 17 in which metasurface beamforming is first performed. In FIG. 20, the horizontal axis represents a beam (e.g., SSB) changing scheme via metasurface beamforming, and the vertical axis represents a beam (e.g., SSB) changing scheme via hybrid beamforming. The meaning of (x, y) in the graph of FIG. 20 is the same as that described above with reference to FIG. 19.

FIG. 20 illustrates an example where K beams are set via metasurface beamforming and M beam groups are set via hybrid beamforming to generate a total of K*M DL signals (e.g., SSB). For example, as indicated by a dashed line in FIG. 20, the base station may fix hybrid beamforming and may generate and transmit a DL signal while changing a beam via metasurface beamforming. When the generation and transmission of the DL signal is concluded for all of the beams that may be generated via metasurface beamforming, the base station may change a beam group to a next beam group by performing hybrid beamforming. The base station may generate and transmit a DL signal by performing beam sweeping via metasurface beamforming, for the next beam group. Generation and transmission of the DL signal in the time-frequency resource domain according to the embodiment of FIG. 20 will now be described in detail.

According to an embodiment, during a first time period 2001 in the time-frequency resource domain, beam sweeping using metasurface beamforming may be performed on a first beam group from among the beam groups that are generated via hybrid beamforming. For example, during the first time period 2001, beams corresponding to the first beam group (e.g., (1,1), (1,2), (1,3), through to (1,K)) may be generated and transmitted. After the lapse of the first time period 2001, the base station may generate a second beam group via hybrid beamforming. During a second time period 2003, beams corresponding to the second beam group (e.g., (2,1), (2,2), (2,3), through to (2,K)) may be generated and transmitted. After the lapse of the second time period 2003, the base station may generate a third beam group via hybrid beamforming. During a third time period 2005, beams corresponding to the third beam group (e.g., (3,1), (3,2), (3,3), through to (3,K)) may be generated and transmitted.

The base station may generate and transmit or receive the DL signal (e.g., SSB) by using a free method suitable for the shape and settings of a metamaterial structure and an antenna of the base station from among the method of FIG. 19 and the method of FIG. 20. In the method of FIG. 20, a control signal may be frequently used to control metasurface beamforming. However, according to an antenna structure, when metasurface beamforming is controlled, a signal processing structure is simple and a signal processing speed is high, compared with hybrid beamforming is controlled, and thus a gain may be obtained in terms of performance.

Figure 21:
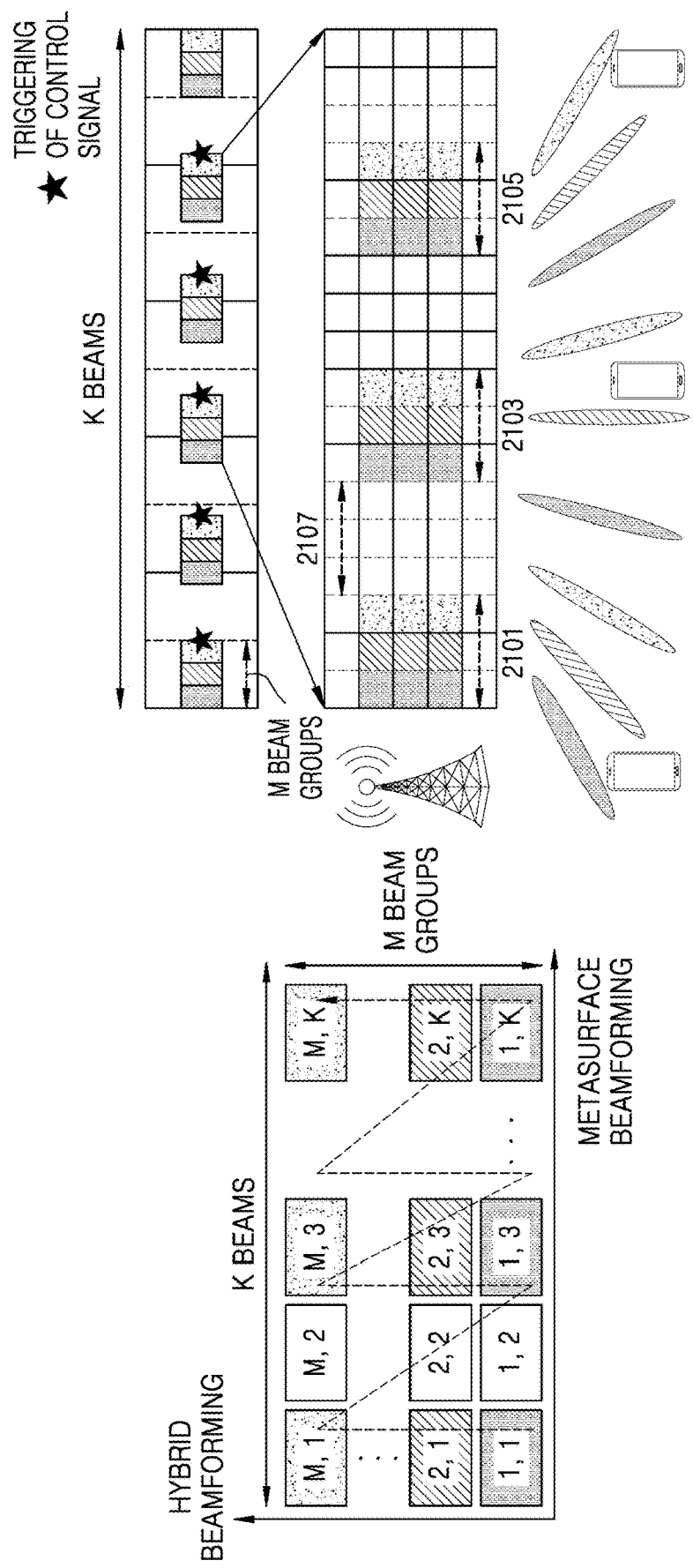
FIG. 21 illustrates a method of transmitting some DL signals via hybrid beamforming and metasurface beamforming, according to an embodiment of the disclosure.

FIG. 21 illustrates a method of transmitting some DL signals via hybrid beamforming and metasurface beamforming, according to an embodiment of the disclosure.

Referring to FIG. 21, the base station may transmit a DL signal such as an SSB or a CSI-RS to the terminal by using only some of K*M beams that may be generated via hybrid beamforming and metasurface beamforming. In other words, according to an embodiment, when the base station uses the above-described 2-stage beam generation structure, transmission of only some of the beams that may be generated may be favorable rather than transmission of all of the beams that may be generated. The base station may transmit the DL signal by omitting, at regular or irregular intervals, some of the beams that may be generated.

For example, in FIG. 21, the base station may not generate and not transmit some beams (e.g., (1,2), (2,2), . . . , and (M,2)) among all beams that may be generated via metasurface beamforming and hybrid beamforming (e.g., (1,1), (2,1), . . . , and (M,1), (1,2), (2,2), . . . , and (M,2), through to (1,K), (2,K), . . . , and (M,K)). In other words, the base station may generate and transmit beams corresponding to a first index of metasurface beamforming (e.g., (1,1), (2,1), through to (M,1)) during a first time period 2101 in the time-frequency domain. The base station may generate and transmit no beams during a second time period 2107. In other words, the base station may not generate and not transmit beams corresponding to a second index of metasurface beamforming (e.g., (1,2), (2,2), through to (M,2)) during the second time period 2107. According to an embodiment, the second time period 2107 may refer to a metasurface adaptation time taken until the base station performs next metasurface beamforming by triggering a control signal.

The base station may generate and transmit beams corresponding to a third index of metasurface beamforming (e.g., (1,3), (2,3), through to (M,3)) during a third time period 2103. The base station may generate and transmit beams corresponding to a fifth index of metasurface beamforming (e.g., (1,5), (2,5), through to (M,5)) after the lapse of the metasurface adaptation time.

According to an embodiment, the base station may transmit the DL signal by omitting, at regular or irregular intervals, some of the beams that may be generated. The base station may receive a feedback of channel state information that the terminal transmits in response to the DL signal. For example, the base station may receive a CSI feedback from the terminal after some SSBs are transmitted, or may receive the CSI feedback from the terminal after some CSI-RSs are transmitted.

According to an embodiment, the base station may receive from the terminal a CSI feedback for the DL signal transmitted by using some beams. When a channel state value included in the CSI feedback for the DL signal is lower than a threshold value, the base station may transmit the DL signal to the terminal by using the omitted beams. On the other hand, when the channel state value is equal to or higher than the threshold value, the base station may not need to transmit the DL signal to the terminal by using the omitted beams. When the channel state value is lower than the threshold value, the base station may additionally search the omitted beams at a next frame or at any of other cycles to find an optimal beam.

For example, the base station may generate and transmit the beams corresponding to the first index of metasurface beamforming (e.g., (1,1), (2,1), through to (M,1)) and may generate and transmit the beams corresponding to the third index of metasurface beamforming (e.g., (1,3), (2,3), through to (M,3)). The base station may receive from the terminal a CSI report for the beams corresponding to the first index of metasurface beamforming and the beams corresponding to the third index of metasurface beamforming. The base station may determine whether to generate and transmit the transmission-omitted beams corresponding to the second index of metasurface beamforming, by comparing a channel state value included in the CSI report received from the terminal with a threshold value. For example, when the channel state value included in the CSI report is less than the threshold value, the base station may generate and transmit the beams corresponding to the second index of metasurface beamforming. On the other hand, when the channel state value included in the CSI report is equal to or greater than the threshold value, the base station may not generate and not transmit the beams corresponding to the second index of metasurface beamforming.

In the embodiment of FIG. 21, the base station transmits some beams according to a preset criterion from among all of the beams that may be transmitted. Thus, the embodiment of FIG. 21 may be used to quickly transmit beams capable of covering a wider area during a limited time period.

Figure 22:
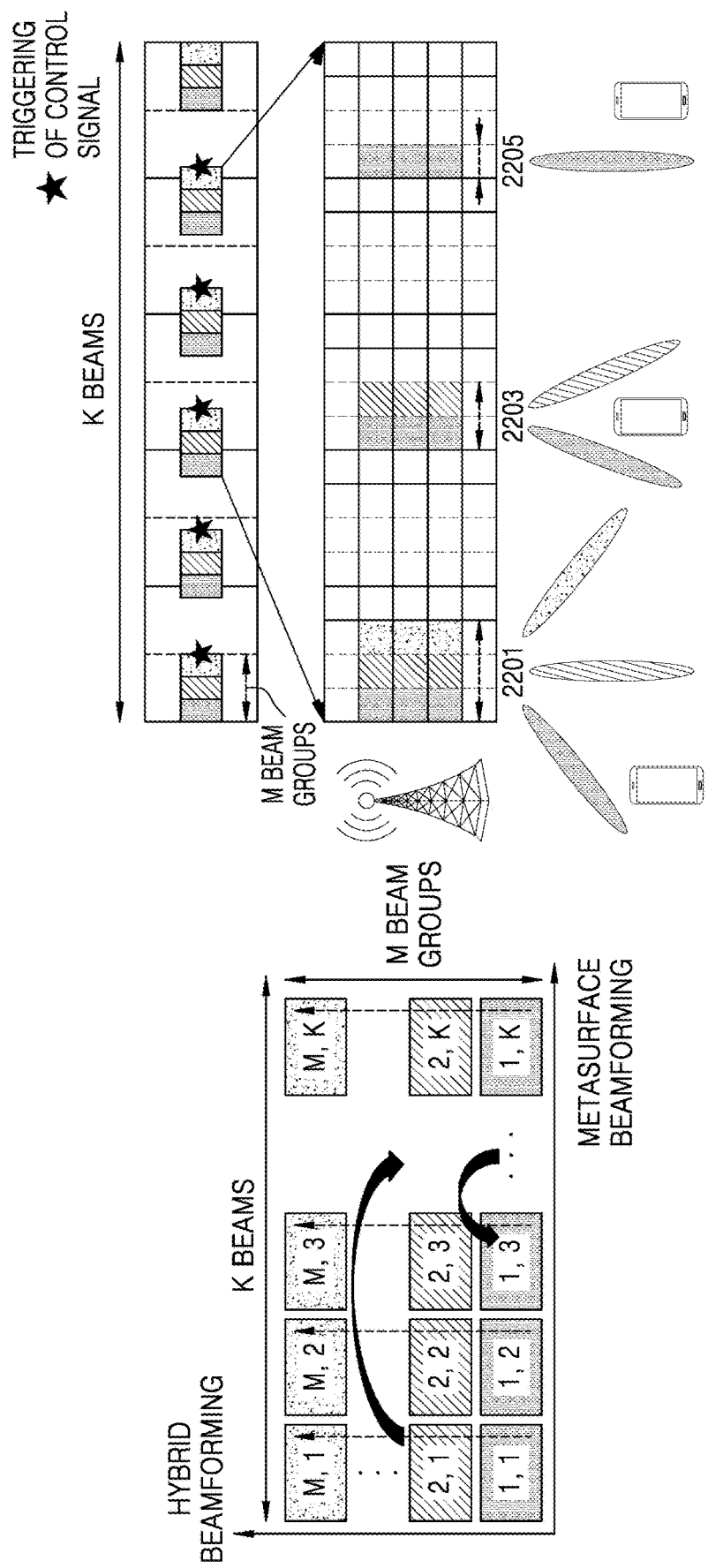
FIG. 22 illustrates a method of transmitting a DL signal by reflecting feedback from the terminal, according to an embodiment of the disclosure.

FIG. 22 illustrates a method of transmitting a DL signal by reflecting a feedback from the terminal, according to an embodiment of the disclosure. The embodiment of FIG. 22 may correspond to the above-described embodiment of FIG. 12.

FIG. 22 illustrates another embodiment of the method of FIG. 21 of transmitting some DL signals. For example, the base station may fix metasurface beamforming, and may transmit a signal having a big beam difference to the terminal while changing hybrid beamforming. The base station may receive a feedback for the transmitted signal from the terminal. When transmitting a next DL signal (e.g., an SSB or a CSI-RS), based on the received feedback, the base station may select the beams corresponding to a beam group having a relatively good channel state from among the beam groups, and may transmit a DL signal to the terminal by using the selected beams.

The base station may select and remove an unnecessary beam group of hybrid beamforming, by operating according to the above-described embodiment. Accordingly, the magnitude of a control signal for transmitting the DL signal may be reduced. When transmitting a synchronization signal (e.g., an SSB), the base station may transmit a signal periodically via hybrid beamforming again while performing the above-described operation for several terminals.

For example, the base station may transmit to the terminal beams corresponding to all beam groups of hybrid beamforming (e.g., a first beam group, a second beam group, through to an M-th beam group) during a first time period 2201 in the time-frequency domain. The base station may receive a CSI feedback for the transmitted DL signal. In a stage for transmitting a next DL signal, the base station may omit the beams corresponding to some beam groups, based on the received CSI feedback, and may transmit the next DL signal by using the beams corresponding to the remaining beam groups. For example, when it is determined based on the received CSI feedback that a channel state value of the beams corresponding to the third beam group is less than a threshold value, the base station may transmit a DL signal by using the beams corresponding to the first beam group and the second beam group except for the beams corresponding to the third beam group, during a second time period 2203. In the same method, the base station may transmit a DL signal by using the beams corresponding to the first beam group except for the beams corresponding to the second beam group, during a third time period 2205. According to an embodiment, the above-described stage may refer to a stage in which the base station receives a report of channel state information from the terminal and performs next beam sweeping based on the received channel state information.

Figure 23:
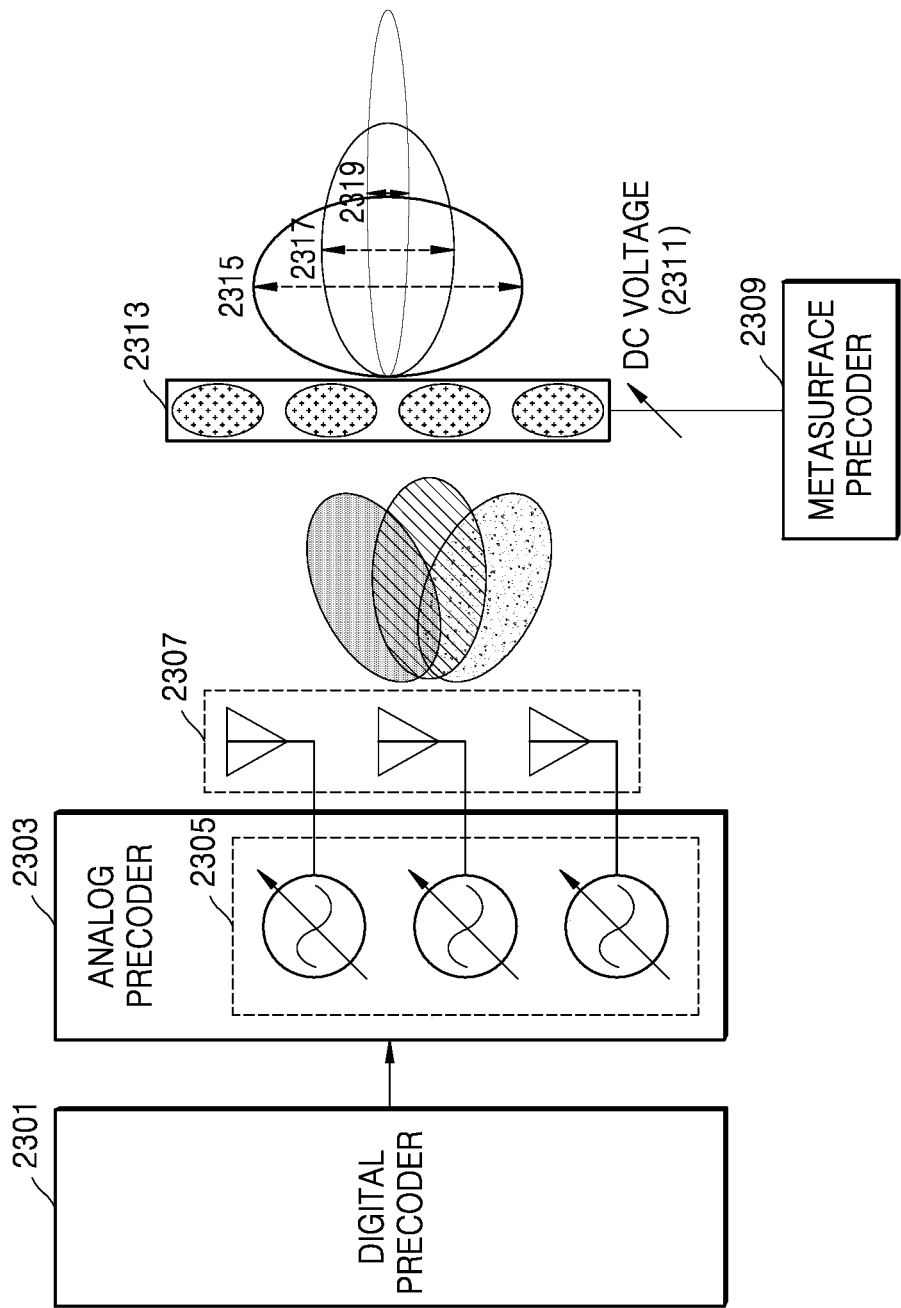
FIG. 23 illustrates a method of adjusting a beam width by using a metamaterial lens, according to an embodiment of the disclosure.

FIG. 23 illustrates a method of adjusting a beam width by using a metamaterial lens, according to an embodiment of the disclosure. The embodiment of FIG. 23 may correspond to the above-described embodiment of FIG. 13.

Referring to FIG. 23, the base station may perform digital beamforming by using a digital precoder 2301, and may perform analog beamforming by using an analog precoder 2303. In other words, the base station may perform hybrid beamforming. The base station may radiate a beam formed via hybrid beamforming via a plurality of antennas 2307. According to an embodiment, the analog precoder 2303 may include an RF phase shifter 2305.

According to an embodiment, the base station may generate a beam by using the plurality of antennas 2307, a metamaterial lens unit 2313, and a metasurface precoder 2309 for generating a control signal for adjusting the metamaterial lens unit 2313. According to an embodiment, the metasurface precoder 2309 may generate beams having various beam widths and various beam intensities by adjusting the metamaterial lens unit 2313 by using the control signal such as a DC voltage 2311. According to an embodiment, in a metamaterial structure where a beam width is set to be large, a beam gain is low and thus a beam transmission distance may be short, compared with a beam with a small beam width. However, when a beam with a large beam width is used, the base station may transmit a beam at a wider angle. According to an embodiment, when the beam width is set to be small, waves may be more collected, and thus a beam transmission distance of a beam having the beam width may increase.

For example, the base station may generate beams having a first beam width 2315, a second beam width 2317, and a third beam width 2319 by adjusting the metamaterial lens unit 2313. The beam width may decrease in a direction from the first beam width 2315 to the third beam width 2319 via the second beam width 2317. Accordingly, when the beam with the first beam width 2315 is used, the base station may compare the beam with the first beam width 2315 with the beam the second beam width 2317 and the beam with the third beam width 2319 to thereby radiate a beam in a wider range. When the beam with the third beam width 2319 is used, the base station may compare the beam with the third beam width 2319 with the beam the first beam width 2315 and the beam with the second beam width 2317 to thereby transmit a beam by a longer distance. The above-described various beam widths, beam intensities, or beam angles may be adjusted when an antenna and a metamaterial are organically combined with each other. A metamaterial lens controller (e.g., the metasurface precoder 2309) may control the properties (e.g., a beam width, a beam intensity, or a beam angle) of a beam independently or dependently of an antenna controller.

Figure 24:
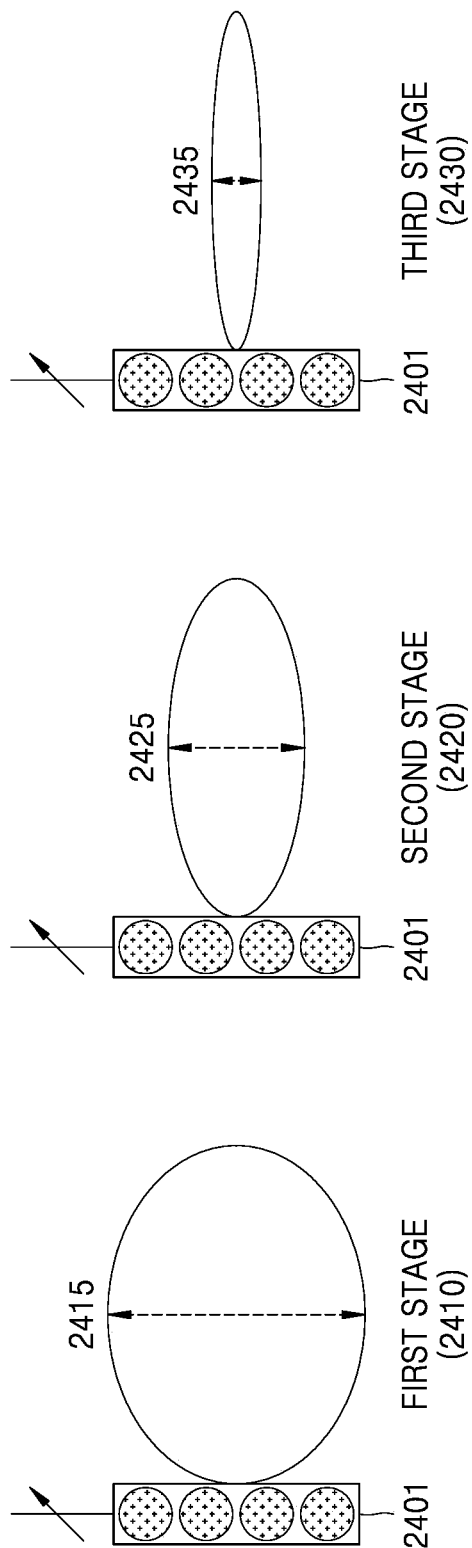
FIG. 24 illustrates a method of adjusting a beam width in stages by using a metamaterial lens, according to an embodiment of the disclosure.

FIG. 24 illustrates a method of adjusting a beam width in stages by using a metamaterial lens, according to an embodiment of the disclosure. FIG. 24 illustrates an example in which a final beam width that passed through the metamaterial lens and a beam gain are adjusted according to the embodiment of FIG. 23.

Referring to FIG. 24, as the beam width decreases, a maximum reach distance of a beam by which the beam may be transmitted may increase. Accordingly, the following technique is proposed by the embodiment of FIG. 24. For example, when the base station transmits a synchronization signal (e.g., an SSB) at an early stage, the base station may transmit the synchronization signal to the terminal by using a beam having a wide range as much as possible. When the terminal successfully receives the synchronization signal and is thus synchronized with the base station and the base station transmits a CSI-RS to the terminal, the base station may transmit the CSI-RS to the terminal by using a beam with a smaller beam width than the beam width of the beam previously used to transmit the synchronization signal. The base station may receive a CSI feedback for the DL signal (e.g., CSI-RS) transmitted to the terminal.

For example, in FIG. 24, the base station may generate a beam with a first beam width 2415 by adjusting a metamaterial lens unit 2401, in a first stage 2410. The base station may transmit a DL signal to the terminal by using the beam with the first beam width 2415. In response to a channel state feedback for the DL signal, the base station may reduce the beam width from the first beam width 2415 to a second beam width 2425 by adjusting the metamaterial lens unit 2401, in a second stage 2420. The base station may transmit a DL signal to the terminal by using a beam with the second beam width 2425. In response to a channel state feedback for the DL signal, the base station may reduce the beam width from the second beam width 2425 to a third beam width 2435 by adjusting the metamaterial lens unit 2401, in a third stage 2430.

According to an embodiment, when a channel state is frequently changed due to a high mobility of the terminal and the beam width decreases, the base station may deviate from the range of a beam that is transmitted to the terminal, and thus a channel state for transmitting the DL signal may become worse. In this situation, when the base station receives the CSI feedback from the terminal, the base station may re-adjust a beam by performing hybrid beamforming or metasurface beamforming by using a signal with a big beam width. The beam adjustment may be determined by the base station via transmission of DL signals such as a synchronization signal and a CSI-RS. When beam property adjustment such as beam width adjustment, beam intensity adjustment, or beam angle adjustment is performed as described above, the base station may reduce ambient noise, and an SINR performance may be improved and thus an overall system performance may be improved. Hereinafter, FIGS. 25 and 26 illustrate structures of a base station and a terminal for performing the above-described embodiments.

Figure 25:
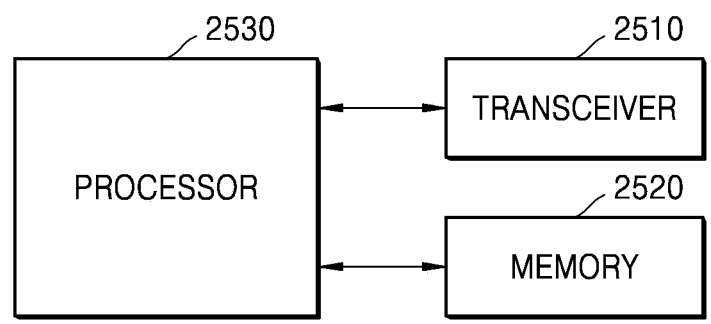
FIG. 25 is a block diagram of a base station according to an embodiment of the disclosure.
Figure 26:
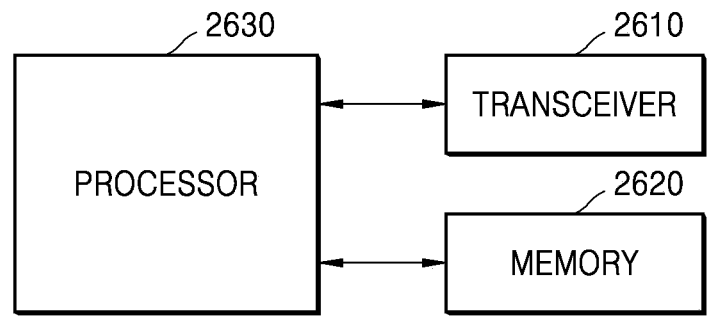
FIG. 26 is a block diagram of a terminal according to an embodiment of the disclosure.

FIG. 25 is a block diagram of a base station according to an embodiment of the disclosure.

Referring to FIG. 25, the base station may include a processor 2530, a transceiver 2510, and a memory 2520. However, components of the base station are not limited thereto. For example, the base station may include more or fewer components than those shown in FIG. 25. Furthermore, the processor 2530, the transceiver 2510, and the memory 2520 may be implemented as a single chip.

The processor 2530 may control a series of processes so that the base station may operate according to the above-described embodiments of the disclosure. For example, a wireless communication system according to an embodiment of the disclosure may control the components of the base station to perform a beam management method using a 2-stage antenna structure.

The transceiver 2510 may transmit or receive a signal to or from the terminal. The signal transmitted or received to or from the terminal may include control information and data. The transceiver 2510 may include an RF transmitter that up-converts and amplifies the frequency of a signal to be transmitted, and an RF receiver that low-noise-amplifies a received signal and down-converts the frequency of the received signal. However, this is only an embodiment of the transceiver 2510, and the components of the transceiver 2510 are not limited to the RF transmitter and the RF receiver. The transceiver 2510 may receive a signal and output the signal to the processor 2530 through a wireless channel, and may transmit the signal output by the processor 2530 through a wireless channel. A plurality of processors 2530 may be included, and the processor 2530 may perform a method of managing a beam by using the 2-stage antenna structure in the above-described wireless communication system according to an embodiment of the disclosure by executing the program stored in the memory 2520.

According to an embodiment of the disclosure, the memory 2520 may store a program and data necessary to operate the base station. Furthermore, the memory 2520 may store control information or data included in a signal transmitted or received to or from the base station. The memory 2520 may include storage media, such as read-only memory (ROM), random access memory (RAM), a hard disk, compact disc (CD)-ROM, and a digital versatile disc (DVD), or a combination thereof. A plurality of memories 2520 may be included. According to an embodiment, the memory 2520 may store a program for executing the method of managing a beam by using the 2-stage antenna structure in the above-described wireless communication system according to an embodiment of the disclosure.

According to an embodiment, FIG. 6 illustrates that the transceiver 600 of the base station includes the metamaterial unit 610 and the antenna unit 620, and the metamaterial unit 610 includes the metamaterial lens unit 611 and the metamaterial lens controller 612. However, the metamaterial lens controller 612 may be included in the processor 2530 or the transceiver 2510 of the base station. For example, the metamaterial lens controller 612 may be included only in the processor 2530 of the base station or may be included only in the transceiver 2510 of the base station, or some functions of the metamaterial lens controller 612 may be distributed into and included in the processor 2530 and the transceiver 2510 of the base station.

FIG. 26 is a block diagram of a terminal according to an embodiment of the disclosure.

Referring to FIG. 26, the terminal may include a processor 2630, a transceiver 2610, and a memory 2620. However, components of the terminal are not limited thereto. For example, the terminal may include more or fewer components than those shown in FIG. 26. Furthermore, the processor 2630, the transceiver 2610, and the memory 2620 may be implemented as a single chip.

According to an embodiment of the disclosure, the processor 2630 may control a series of processes so that the terminal may operate according to the above-described embodiment of the disclosure. For example, a wireless communication system according to an embodiment of the disclosure may control the components of the terminal to perform a beam management method using a 2-stage antenna structure. A plurality of processors 2630 may be included, and the processor 2630 may perform a beam management method using the 2-stage antenna structure by executing the program stored in the memory 2620.

The transceiver 2610 may transmit or receive a signal to or from the base station. The signal transmitted or received to or from the base station may include control information and data. The transceiver 2610 may include an RF transmitter that up-converts and amplifies the frequency of a signal to be transmitted, and an RF receiver that low-noise-amplifies a received signal and down-converts the frequency of the received signal. However, this is only an embodiment of the transceiver 2610, and the components of the transceiver 2610 are not limited to the RF transmitter and the RF receiver. The transceiver 2610 may receive a signal and output the signal to the processor 2630 through a wireless channel, and may transmit the signal output by the processor 2630 through a wireless channel.

According to an embodiment of the disclosure, the memory 2620 may store a program and data necessary to operate the terminal. Furthermore, the memory 2620 may store control information or data included in a signal transmitted or received to or from the terminal. The memory 2620 may include storage media, such as ROM, RAM, a hard disk, CD-ROM, and a DVD, or a combination thereof. A plurality of memories 2620 may be included. According to an embodiment, the memory 2620 may store a program for executing the method of managing a beam by using the 2-stage antenna structure in the above-described wireless communication system according to an embodiment of the disclosure.

According to an embodiment, FIG. 6 illustrates that the transceiver 600 of the terminal includes the metamaterial unit 610 and the antenna unit 620, and the metamaterial unit 610 includes the metamaterial lens unit 611 and the metamaterial lens controller 612. However, the metamaterial lens controller 612 may be included in the processor 2630 or the transceiver 2610 of the terminal. For example, the metamaterial lens controller 612 may be included only in the processor 2630 of the terminal or may be included only in the transceiver 2610 of the terminal, or some functions of the metamaterial lens controller 612 may be distributed into and included in the processor 2630 and the transceiver 2610 of the terminal.

The methods according to embodiments of the disclosure as described in the description or in the following claims may be implemented as hardware, software, or a combination of hardware and software.

When implemented as software, a computer-readable storage medium or computer program product storing one or more programs (e.g., software modules) may be provided. The one or more programs stored in the computer-readable storage medium or computer program product are configured for execution by one or more processors in an electronic device. The one or more programs include instructions directing the electronic device to execute the methods according to embodiments of the disclosure as described the specification or in the following claims.

The programs (e.g., software modules or software) may be stored in non-volatile memory (including RAM or flash memory), ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), and a storage area network (SAN). Such a storage device may access the electronic device performing the embodiments of the disclosure via an external port. Furthermore, a separate storage device on the communication network may access a device performing the embodiments of the disclosure.

In the disclosure, the terms "computer program product" or "computer readable storage medium" are used as generic terms for a medium such as a memory, a hard disk installed in a hard disk drive, and a signal. "The computer program product" or "the computer readable storage medium" are provided for a method according to the disclosure of generating a first beam via hybrid beamforming in an antenna unit, transmitting the generated first beam to a metamaterial lens unit, generating a second beam from the first beam by adjusting the metamaterial lens unit based on a control signal generated by a metamaterial lens controller, and transmitting a DL signal to a terminal by using the generated second beam.

In the above-described embodiments of the disclosure, the elements included in the disclosure are expressed in a singular or plural form according to the proposed specific embodiment of the disclosure. However, the singular or plural expression is appropriately selected for ease of description according to the presented situation, and the disclosure is not limited to a single element or plural elements. Those elements described in a plural form may be configured as a single element, and those elements described in a singular form may be configured as plural elements.

Provided is a method and apparatus capable of effectively providing services in a wireless communication system.

Although the present disclosure has been described with various embodiments, various changes and modifications may be suggested to one skilled in the art. It is intended that the present disclosure encompass such changes and modifications as fall within the scope of the appended claims.

What is claimed is:

1. A base station in a wireless communication system, the base station comprising:
    a transceiver comprising an antenna unit and a metamaterial unit, wherein the metamaterial unit comprises a metamaterial lens unit and a metamaterial lens controller; and
    at least one processor operably connected to the transceiver, the at least one processor configured to:
        generate a first beam via a hybrid beamforming operation at the antenna unit,
        radiate the generated first beam to the metamaterial lens unit,
        control the metamaterial lens controller to generate a control signal to adjust physical properties of the metamaterial lens unit for the generated first beam,
        generate, based on the generated first beam, a second beam; and
        transmit, to a terminal, a downlink signal based on the generated second beam.

2. The base station of claim 1, wherein:
    the metamaterial lens controller is configured to generate the control signal based on information associated with a beam property of the first beam,
    the information associated with the beam property comprises at least one of an intensity of the first beam, a direction of the first beam, or a beam width of the first beam, and
    the second beam is generated based on the beam property of the first beam.

3. The base station of claim 2, wherein:
    the metamaterial lens unit comprises a plurality of metamaterial elements, and
    the at least one processor is further configured to:
        adjust, based on the control signal, the physical properties of the plurality of metamaterial elements included in the metamaterial lens unit;
        determine a phase difference of the first beam when physical property of each of the plurality of metamaterial elements is adjusted; and
    generate, based on the determined phase difference, the second beam by re-radiating the first beam from the metamaterial lens unit.

4. The base station of claim 1, wherein:
    the first beam generated via the hybrid beamforming operation comprises at least one beam group, and
    the second beam generated from the first beam comprises a plurality of beams corresponding to each of the at least one beam group included in the first beam.

5. The base station of claim 4, wherein:
    the at least one beam group included in the first beam comprises a first beam group and a second beam group,
    the at least one processor is further configured to:
        generate, based on the control signal, first beam corresponding to the first beam group from among the plurality of beams by adjusting the metamaterial lens unit, and
        transmit, based on the first beam corresponding to the first beam group, the downlink signal by performing beam sweeping.

6. The base station of claim 5, wherein:
the at least one processor is further configured to:
- generate, based on the control signal, second beams corresponding to the second beam group from among the plurality of beams by adjusting the metamaterial lens unit, and
- transmit, based on the second beams corresponding to the second beam group, the downlink signal by performing the beam sweeping.

7. The base station of claim 4, wherein:
the at least one beam group included in the first beam comprises a first beam group and a second beam group; and
the at least one processor is further configured to:
- generate a third beam with a first index from the first beam group and a fourth beam with the first index from the second beam group, and
- transmit the downlink signal based on the third beam with the first index from the first beam group and the fourth beam with the first index from the second beam group.

8. The base station of claim 7, wherein the at least one processor is further configured to:
- generate, based on the control signal, a fifth beam with a second index among from the first beam group and a sixth beam with the second index from the second beam group by adjusting the metamaterial lens unit; and
- transmit the downlink signal based on the fifth beam with the second index from the first beam group and the sixth beam with the second index from the second beam group.

9. The base station of claim 4, wherein the at least one processor is further configured to:
- receive, from the terminal, a response in response to transmitting the downlink signal;
- select the at least one beam group included in the first beam based on the received response; and
- transmit, to the terminal, the downlink signal based on the selected at least one beam group.

10. The base station of claim 4, wherein the at least one processor is further configured to:
- receive, from the terminal, a response in response to transmitting the downlink signal; and
- adjust, based on the received response, a beam width of the second beam by adjusting the antenna unit or the metamaterial lens unit.

11. A method of a base station in a wireless communication system, the method comprising:
- generating a first beam via a hybrid beamforming operation at an antenna unit;
- radiating the generated first beam to a metamaterial lens unit;
- generating a control signal to adjust physical properties of the metamaterial lens unit for the generated first beam;
- generating, based on the generated first beam, a second beam; and
- transmitting, to a terminal, a downlink signal based on the generated second beam.

12. The method of claim 11, further comprising:
generating the control signal based on information associated with a beam property of the first beam,
wherein:
- the information associated with the beam property comprises at least one of an intensity of the first beam, a direction of the first beam, or a beam width of the first beam, and
- the second beam is generated based on a beam obtained by changing the beam property of the first beam.

13. The method of claim 12, further comprising:
- adjusting, based on the control signal, the physical properties of a plurality of metamaterial elements included in the metamaterial lens unit;
- determining a phase difference of the first beam incident upon when physical property of each of the plurality of metamaterial elements is adjusted; and
- generating, based on the determined phase difference, the second beam by re-radiating the first beam from the metamaterial lens unit,
wherein the metamaterial lens unit comprises the plurality of metamaterial elements.

14. The method of claim 11, wherein:
the first beam generated via the hybrid beamforming operation comprises at least one beam group, and
the second beam generated from the first beam comprises a plurality of beams corresponding to each of the at least one beam group included in the first beam.

15. The method of claim 14, further comprising:
- generating, based on the control signal, first beam corresponding to a first beam group from among the plurality of beams by adjusting the metamaterial lens unit; and
- transmitting, based on the first beam corresponding to the first beam group, the downlink signal by performing beam sweeping,
wherein the at least one beam group included in the first beam comprises the first beam group and a second beam group.

16. The operation method of claim 15, further comprising:
- generating, based on the control signal, second beams corresponding to the second beam group from among the plurality of beams by adjusting the metamaterial lens unit; and
- transmitting, based on the second beams corresponding to the second beam group, the downlink signal by performing the beam sweeping.

17. The method of claim 14, further comprising:
- generating a third beam with a first index from a first beam group and a fourth beam with the first index from a second beam group; and
- transmitting the downlink based on the third beam with the first index from the first beam group and the fourth beam with the first index from the second beam group,
wherein the at least one beam group included in the first beam comprises the first beam group and the second beam group.

18. The method of claim 17, further comprising:
- generating, based on the control signal, a fifth beam with a second index among from the first beam group and a sixth beam with the second index from the second beam group by adjusting the metamaterial lens unit, and
- transmitting the downlink signal based on the fifth beam with the second index from the first beam group and the sixth beam with the second index from the second beam group.

19. The method of claim 14, further comprising:
- receiving, from the terminal, a response in response to transmitting the downlink signal;
- selecting the at least one beam group included in the first beam based on the received response; and
- transmitting, to the terminal, the downlink signal to based on the selected at least one beam group.

20. The method of claim 14, further comprising:
- receiving, from the terminal, a response in response to transmitting the downlink signal; and adjusting, based on the received response, a beam width of the second beam by adjusting the antenna unit or the metamaterial lens unit.

\* \* \* \* \*